US008037714B2

(12) United States Patent
Mann, III et al.

(10) Patent No.: US 8,037,714 B2
(45) Date of Patent: Oct. 18, 2011

(54) ADJUSTABLE AIR CONDITIONING CONTROL SYSTEM FOR A UNIVERSAL AIRPLANE GROUND SUPPORT EQUIPMENT CART

(75) Inventors: James W. Mann, III, Saint Petersburg, FL (US); Jeffrey E. Montminy, Riverview, FL (US); Benjamin E. Newell, Urbana, IL (US); Ty A. Newell, Urbana, IL (US)

(73) Assignee: Illinois Tool Works Inc., Glenview, IL (US)

( * ) Notice: Subject to any disclaimer, the term of this patent is extended or adjusted under 35 U.S.C. 154(b) by 479 days.

(21) Appl. No.: 12/250,503

(22) Filed: Oct. 13, 2008

(65) Prior Publication Data

US 2009/0107159 A1 Apr. 30, 2009

Related U.S. Application Data

(60) Provisional application No. 60/984,142, filed on Oct. 31, 2007, provisional application No. 60/984,155, filed on Oct. 31, 2007, provisional application No. 61/036,756, filed on Mar. 14, 2008.

(51) Int. Cl.
F25B 41/00 (2006.01)
(52) U.S. Cl. .......................................................... 62/513
(58) Field of Classification Search ................ 62/513, 62/239, 335, 426, 196.4
See application file for complete search history.

(56) References Cited

U.S. PATENT DOCUMENTS
4,272,967 A 6/1981 White et al.
4,370,868 A 2/1983 Kim 4,653,580 A 3/1987 Steele
(Continued)

FOREIGN PATENT DOCUMENTS
DE 29702259 U1 6/1997
(Continued)

OTHER PUBLICATIONS

PCT/US2008/081081—International Search Report. dated Mar. 25, 2009.

(Continued)

*Primary Examiner* — Melvin Jones
(74) *Attorney, Agent, or Firm* — Perry Hoffman

(57) ABSTRACT

A ground support equipment air conditioning system detachably connects to a port on an airplane. An air conduit connects an air intake and filter to a coupling that is adapted to be connected to one end of an air duct or hose the other end of which is adapted to be connected to an airplane's port. A variable speed blower in the air conduit has its speed varied by a controller to regulate the pressure supplied to an airplane. This controller receives as inputs the pressure sensed by a pressure sensor connected to the air conduit adjacent the coupling to sense the pressure of air passing into the airplane and also a setpoint pressure which can be varied to match the requirements of different types or classes of airplane. First and second air conditioners each include a circular refrigerant conduit channeling refrigerant through a compressor, a condenser, an expansion valve, and an evaporator. The evaporators are positioned in the air conduit with the first air conditioner's evaporator preceding the blower and the second air conditioner's evaporator following the blower in the air conduit. A condenser cooling fan drives air through the two condensers and is controlled by a controller responsive to one or more pressures or temperatures measured in one of the air or refrigerant conduits or in the surrounding air.

26 Claims, 22 Drawing Sheets

U.S. PATENT DOCUMENTS

| | | | |
|---|---|---|---|
| 4,993,145 | A | 2/1991 | Gray |
| 5,023,791 | A | 6/1991 | Herzberg et al. |
| 5,031,690 | A | 7/1991 | Anderson et al. |
| 5,247,804 | A | 9/1993 | Paige |
| 5,355,024 | A | 10/1994 | Elliott et al. |
| 5,386,147 | A | 1/1995 | Bonneau et al. |
| 5,701,760 | A | 12/1997 | Torigoe et al. |
| 5,757,633 | A | 5/1998 | Bowles |
| 5,954,577 | A * | 9/1999 | Meckler .................. 454/75 |
| 6,320,773 | B1 | 11/2001 | Urish et al. |
| 6,424,891 | B1 | 7/2002 | Sargent et al. |
| 6,964,296 | B2 | 11/2005 | Memory |
| 6,988,538 | B2 | 1/2006 | Merkys |
| 7,032,313 | B2 | 4/2006 | Memory |
| 7,044,200 | B2 | 5/2006 | Gupte |
| 7,152,670 | B2 | 12/2006 | Dobbs |
| 7,254,956 | B2 | 8/2007 | Matonog |
| 7,257,958 | B2 | 8/2007 | Bush |
| 2005/0067137 | A1 | 3/2005 | Barnwell |
| 2005/0161202 | A1 | 7/2005 | Merkys et al. |
| 2006/0201173 | A1 | 9/2006 | Leathers |
| 2007/0209383 | A1 | 9/2007 | Hutton |

FOREIGN PATENT DOCUMENTS

| | | | |
|---|---|---|---|
| FR | 2897340 | A | 8/2007 |
| GB | 2150278 | A | 6/1985 |
| GB | 2428651 | A | 6/1985 |
| WO | 2005124990 | A2 | 12/2005 |
| WO | 2007061622 | A1 | 5/2007 |

OTHER PUBLICATIONS

PCT/US2008/081081—Written Opinion of the International Searching Authority. dated Mar. 25, 2009.

PCT/US2008/081081—Notification of Transmittal of the International Search Report and the Written Opinion of the International Searching Authority or the Declaration. Mar. 25, 2009.

PCT/US2008/080871—International Search Report. dated Mar. 25, 2009.

PCT/US2008/080871—Written Opinion of the International Searching Authority. dated Mar. 25, 2009.

PCT/US2008/080871—Notification of Transmittal of the International Search Report and the Written Opinion of the International Searching Authority or the Declaration. Mar. 25, 2009.

PCT/US2008/080709—International Search Report. dated Feb. 3, 2009.

PCT/US2008/080709—Written Opinion of the International Searching Authority. dated Feb. 3, 2009.

PCT/US2008/080709—Notification of Transmittal of the International Search Report and the Written Opinion of the International Searching Authority or the Declaration.Feb. 3, 2009.

PCT/US2008/081072—International Search Report. dated Mar. 26, 2009.

PCT/US2008/081072—Written Opinion of the International Searching Authority. dated Mar. 26, 2009.

PCT/US2008/081072—Notification of Transmittal of the International Search Report and the Written Opinion of the International Searching Authority or the Declaration.Mar. 26, 2009.

* cited by examiner

FIG. 19

ELECTRICAL VALUES
- 1708 Ph A V>
- 1710 Ph A I>
- 1712 Ph B V>
- 1714 Ph B I>
- 1716 Ph C V>
- 1718 Ph C I>
- 1720 BLOWER V>
- 1722 BLOWER I>
- 1724 PRE-C V>
- 1726 PRE-C I>
- 1728 POST-C V>
- 1730 POST-C I>
- 1732 PHASE MONITOR>

PRESSURE AND TEMP
- 611 PRE-C DISCH>
- 607 PRE-C COND>
- 616 PRE-C SUCT L>
- 634 PRE-C EVAP>
- 609 PRE-C SUCT>
- 711 POST-C DISCH>
- 707 POST-C COND>
- 716 POST-C SUCT L>
- 739 POST-C EVAP>
- 709 POST-C SUCT>
- 832 PAO OUTPUT>

PRESSURE
- 526 AT OUTPUT>
- 543 AT BLOWER>
- 528 ACCR. AIR FILTER>
- 530 ACCR. PRE-C>
- 532 ACCR. BLOWER>
- 534 ACCR. POST-C>

AIR CONDITIONING AND PAO PROCESSOR

TEMPERATURE
- <538 AMBIENT 538
- <540 PRE-COOL 540
- <542 BLOWER 542
- <526 DELIVERED 526
- <PAO RETURN TEMP 827
- <PAO RESERV TEMP 850

LIQUID LEVEL
- <PAO LIQUID LEVEL 824

ON/OFF SIGNAL OUTPUTS
- >PAO PUMP 805
- >PAO VACUUM PUMP 833
- >PAO SUPPLY VALVE 819
- >PRE-C ISOL. SOL. 1734
- >PRE-C COMPR. ON 1702
- >PRE-C SHUTOFF 603
- >POST-C ISOL. SOL. 1732
- >POST-C COMPR. ON 1704
- >POST-C SHUTOFF 703
- >COMP FAN LOW SPD 415
- >COMP FAN HI SPD 417
- >BLOWER VFD ON 1734

0 - 10 V SIGNAL OUTPUTS
- >PRE-C EEV 620
- >PRE-C EGBV 638
- >PRE-C EPR 652
- >POST-C EEV 720
- >POST-C EGBV 738
- >POST-C EPR 732
- >BLOWER SPEED 1706
    (SERIAL LINK)

1900

ADJUSTABLE AIR CONDITIONING CONTROL SYSTEM FOR A UNIVERSAL AIRPLANE GROUND SUPPORT EQUIPMENT CART

This application is a non provisional of provisional application Ser. No. 60/984,142 filed Oct. 31, 2007, provisional application Ser. No. 60/984,155 filed Oct. 31, 2007, and provisional application Ser. No. 61/036,756 filed Mar. 14, 2008.

CROSS-REFERENCE TO RELATED APPLICATIONS

The present patent application is one of a set of commonly owned applications filed on the same day as the present application, sharing some inventors in common, and relating to airplane ground support equipment and carts. The other applications in this set, listed here, are hereby incorporated by reference into the present application: "A Multi-Voltage Power Supply for a Universal Airplane Ground Support Equipment Cart," James W. Mann, III and David Wayne Leadingham (US 2009/0121552 A1); "An Adjustable Cooling System for Airplane Electronics," Jeffrey E. Montminy and Steven E. Bivens (US 2009/0107657 A1); "A Frame and Panel System for Constructing Modules to be Installed on an Airplane Ground Support Equipment Cart," Jeffrey E. Montminy, Brian A. Teeters, and Kyta Insixiengmay (US 2009/0108549 A1); "A System of Fasteners for Attaching Panels onto Modules that are to be Installed on an Airplane Ground Support Equipment Cart," Jeffrey E. Montminy, Brian A. Teeters, and Kyta Insixiengmay (US 2009/0110471 A1); "Airplane Ground Support Equipment Cart Having Extractable Modules and a Generator Module that is Separable from Power and Air Conditioning Modules," James W. Mann, III and Jeffrey E. Montminy (US 2009/0108552 A1); "A Compact, Modularized Air Conditioning System that can be Mounted Upon an Airplane Ground Support Equipment Cart," Jeffrey E. Montminy, Kyta Insixiengmay, James W. Mann, III, Benjamin E. Newell, and Ty A. Newell (US 2009/0107160 A1); and "Maintenance and Control System for Ground Support Equipment," James W. Mann, III, Jeffrey E. Montminy, Steven E. Bivens, and David Wayne Leadingham (US 2009/0112368 A1).

BACKGROUND OF THE INVENTION

1. Field of the Invention

The present invention relates generally to the field of airplane ground support equipment carts and more particularly to an adjustable airplane air conditioning control system for an airplane ground support equipment cart.

2. Description of the Related Art

When an airplane is on the ground with its engines shut down, the airplane is typically unable to provide power for its electrical systems and chilled air for its air conditioning systems; and some airplanes are also unable to provide liquid coolant for some critical electronic (or "avionic") components. It is customary to connect such a grounded airplane to an airplane ground support equipment system. Such a system may have its components mounted upon a mobile equipment cart that is called an airplane ground support equipment cart and that may be parked, placed, or mounted conveniently close to an airplane requiring ground support. Such a cart typically contains an air conditioner that can provide conditioned and cooled air to an airplane plus an electrical power converter that can transform power drawn from the local power grid into power of the proper voltage (AC or DC) and frequency required by the airplane. Such an airplane ground support equipment cart may also contain a diesel engine connected to an electrical generator that enables the cart to provide both air conditioning and also electrical power for an airplane without any connection to the local power grid. And if an airplane requires a source of cooled liquid for its electronics, some carts may also include a source of liquid coolant.

In the past, particularly with regard to military airplanes, such ground support equipment carts have been custom designed to meet the specialized needs of a single particular type or class of airplane. Hence, a cart designed to support the specific requirements and needs of a first type or class of airplane cannot be used to support the differing specific requirements and needs of other types or classes of airplanes. Different airplanes typically may require different pressures and volumes of cooled air, different amounts of electrical power, different electrical voltage levels, and different electrical frequencies (or direct current). And different airplanes typically may require differing pressures and volumes of cooled liquid for use in cooling onboard electronics. Accordingly, every airport must be supplied with as many different types of ground support equipment carts as there are different types or classes of airplanes that may land and take off at each airport or military base. Problems arise when more airplanes of a particular type arrive at a specific location than there are ground support equipment carts suitably designed to service the needs of that particular type or class of airplane.

To be more specific, some airplanes require their ground support equipment to provide considerably more airflow at higher pressures than do other airplanes having smaller interiors. Some airplanes require their electrical power to be adjusted to 115 volts of alternating current (A.C.) which alternates, or flows back and forth, 400 times each second (115 volts, 400 Hz A.C.). Other airplanes require 270 volts direct current (270 volts, D.C.) that does not flow back and forth. Yet other airplanes require a source of 28 volts of direct current (28 volts, D.C.). And airplanes also differ in the amount of electrical power that they draw.

Some airplanes, particularly jet fighters, need an additional source of cooling from their ground support equipment in the form of a liquid coolant that is applied to the so-called avionics systems, including electronics and radar systems. This liquid is typically a polyalphaolefin, or PAO, heat transport fluid or liquid coolant. This fluid is propelled by a pump through one or more heat exchangers within the airplane that cool the liquid using cool air that is present whenever the airplane's turbo fan propulsion engine is in operation. The cooled liquid is then passed through the avionics.

When such an airplane's engine is not in operation, the PAO fluid must be cooled in some other manner to prevent the avionics from overheating. One way to accomplish this is to include in the airplane ground support equipment a PAO pump and a mechanism for cooling the PAO heat transport fluid. A pair of hoses can connect the airplane's PAO fluid system to the ground support equipment, and a circular flow between the airplane and the ground support equipment is established whereby the PAO fluid flows out of the avionics in the airplane to the ground support equipment where the pump propels the fluid through some form of heat exchange mechanism to cool the fluid, which then flows back into the airplane and into the avionics. Since the temperature and pressure and fluid flow volume requirements for PAO cooling may vary from one type or class of airplane to the next, a PAO cooling system designed to meet the specialized PAO cooling needs of one airplane will not necessarily meet the somewhat different needs of another type or class of airplane.

As an example of an airplane cart arrangement that provides air and electrical conditioning for an airplane, PCT patent application No. PCT/US2006/043312 (Intl. Pub. No. WO 2007/061622 A1 published on May 31, 2007) discloses an airplane ground support cart that has a modular design of its electrical conditioning components. This cart provides air conditioning and electrical power conversion as well as optional electrical power generation services to airplanes. FIG. 5 reveals that the cart disclosed in this patent application may receive interchangeable, modular power conversion modules. Thus, a module 72, which generates 3-phase 115 volt 400 Hz A.C. power, may be removed and replaced with a module 78, which generates 270 volt D.C. power. FIG. 6 illustrates that this cart may also accept a module 92, which generates 28 volt D.C. electrical power.

FIG. 2 of the above PCT patent application illustrates a typical arrangement of the mechanical components of a dual air conditioning system within an airplane ground support equipment cart 14. The air conditioner's mechanical components are spread all across the entire length of the cart 14. Two sets of condenser coils 34 are positioned at one end of the cart 14; and the thickness of the coils 34 and their housing, together with the thickness of the associated cooling fans, occupies roughly one-fifth of the cart's overall length. A filter and upstream evaporation coil 30 and a downstream evaporation coil 40 and outlet connection 42 (to which can be attached a duct leading to an airplane) are positioned at the other extreme end of the cart 14, occupying somewhat less than one-fifth of the cart's overall length. A blower fan 32, a discharge plenum 38, and two compressors 36 are shown positioned in the central portions of the cart 14. These mechanical components of the air conditioning system are not confined within a rectangular module within a portion of the volume of the cart 14—these components are spread all across the cart 14 and thus cannot be conveniently removed from the cart for servicing or for use away from the cart 14. Other cart components, such as a diesel engine 54 and generator 56 (shown in FIG. 4 of the PCT application) and an electrical power converter unit 72 (shown in FIG. 5 of the PCT application) are squeezed in among the air conditioning components wherever there is room. This intermixing of non-air-conditioning components with the air-conditioning components greatly complicates servicing of all the components, since they are all crowded into the same cramped space. A service man working on the air conditioner compressors or blowers may find the diesel engine 54 and generator 56 are in the way of these components, for example.

The air conditioning systems of such a conventional ground support equipment system is also designed to provide a particular volume of cooled air at a particular temperature and pressure to a particular type or class of airplane. If such a system has its cool air ducted into some other type or class of airplane, too much or too little air will flow from the air conditioner system, and this will throw off the balance of the air conditioning system, causing the air to be cooled too little or too much and possibly causing icing of the internal evaporators or damage to the airplane. And the temperature and pressure provided may not be proper for some other type or class of airplane. Likewise, the electrical systems may not be able to supply the needs of differing types or classes of airplanes, and the PAO liquid cooling system may not be properly balanced when used to cool the avionics of differing types or classes of airplanes.

SUMMARY OF THE INVENTION

An embodiment of the invention relates to an air conditioning system which detachably connects to a port on an airplane. An air conduit connects an air intake and filter to a coupling that is adapted to be connected to one end of an air duct or hose the other end of which is adapted to be connected to an airplane's port. A variable speed blower in the air conduit has its speed varied by a controller to regulate the pressure supplied to an airplane. This controller receives as inputs the pressure sensed by a pressure sensor connected to the air conduit adjacent the coupling to sense the pressure of air passing into the airplane and also a setpoint pressure which can be varied to match the requirements of different types or classes of airplane. First and second air conditioners each include a circular refrigerant conduit channeling refrigerant through a compressor, a condenser, an expansion valve, and an evaporator. The evaporators are positioned in the air conduit with the first air conditioner's evaporator preceding the blower and the second air conditioner's evaporator following the blower in the air conduit. A condenser cooling fan drives air through the two condensers and is controlled by a controller responsive to one or more pressures or temperatures measured in one of the air or refrigerant conduits or in the surrounding air.

An embodiment of the invention includes in at least one air conditioner a refrigerant circuit that bypasses the condenser and expansion valve and that includes a compressor exhaust bypass valve controlled by a controller receiving a signal from a temperature sensor connected to the air conduit downstream of the air conditioner's evaporator and also receiving a setpoint temperature value. Another embodiment includes in at least one air conditioner an evaporator pressure regulator valve in the refrigerant conduit upstream from the compressor controlled by a controller receiving a signal from a temperature sensor connected to the refrigerant conduit downstream from the evaporator and also receiving a setpoint temperature value. Yet another embodiment includes in at least one air conditioner temperature sensors sampling temperatures of the refrigerant upstream and downstream of the evaporator and feeding these temperatures into a controller which regulates the evaporator expansion valve to keep the evaporator whetted. Another embodiment includes in at least one air conditioner a suction line subcooler comprising a heat exchanger coupling the refrigerant conduit upstream of the evaporator expansion valve to the refrigerant conduit.

BRIEF DESCRIPTION OF THE DRAWINGS

FIG. 19 illustrates and names all of the significant system state signals (temperatures, pressures, etc.) that enter the air conditioning and PAO processor, and it also illustrates all of the significant on/off and 0-to-10 volt output control signals which that processor generates to control all of the air conditioning processes, thereby allowing the air conditioner system to respond flexibly and properly to widely varying load conditions that can be caused by different types and classes of airplanes.

DETAILED DESCRIPTION OF THE INVENTION

Figure 1:
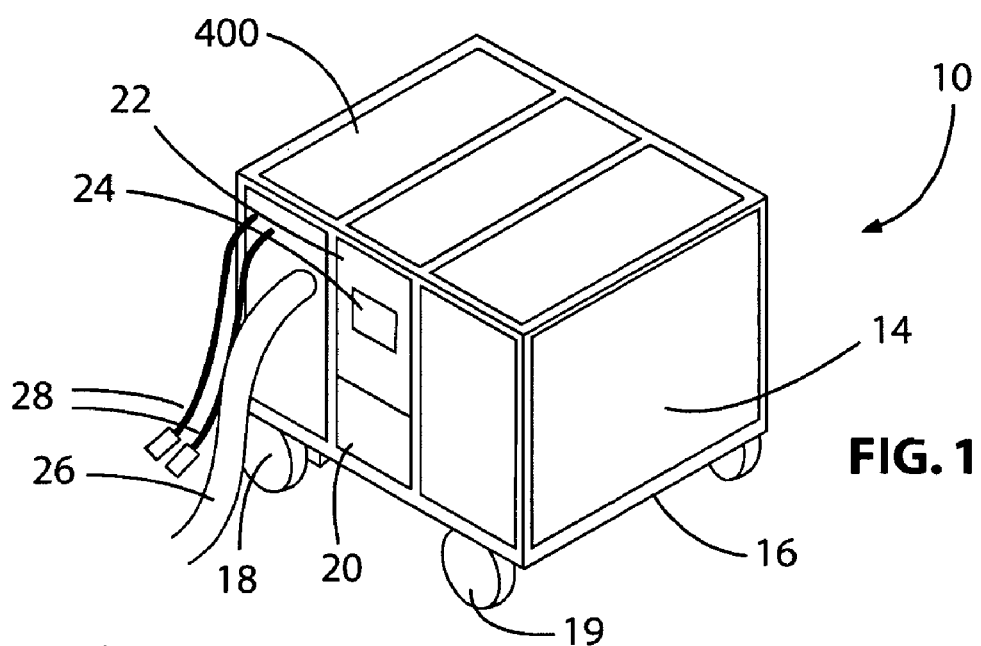
FIG. 1 is an isometric view of an embodiment of a universal airplane ground support equipment cart having a modular design.
Figure 2:
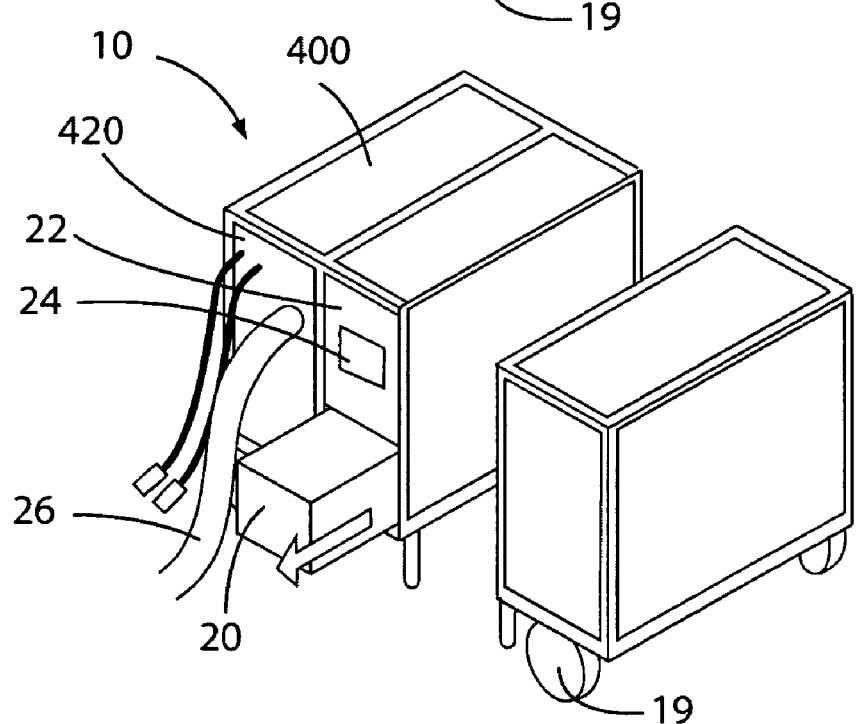
FIG. 2 is an isometric view of the cart shown in FIG. 1 with the diesel engine and generator module portion that forms the back portion of the cart shown separated from the rest of the cart.
Figure 3:
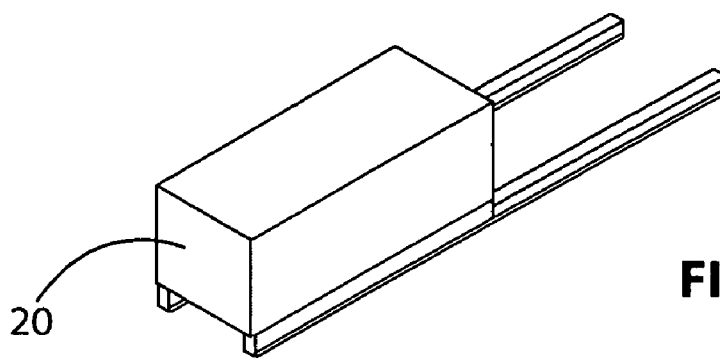
FIG. 3 is an isometric view of an electrical conversion module of the cart shown in FIG. 1 to illustrate how it may be slid out of and away from the side of the cart for maintenance purposes or to be replaced with a different module.

The detailed description which follows is broken into two sections. Section A presents an introduction to the environment of the present invention, which relates to the design of an adjustable air conditioning control system for a modularized universal airplane ground support equipment cart (FIGS. 1-3). Section B presents a detailed description of the air conditioning control system in the context of the complete ground support air conditioning system, including that system's internal mechanical details (FIGS. 1-4, 9-12, and 29), air flow details (FIG. 5), refrigerant and PAO coolant flow path details (FIGS. 6-8), electronic control system details (FIGS. 13-19), and display system and human interaction details (FIGS. 20-28). The focus of the present invention is the air conditioner control system (disclosed in a somewhat simplified form in FIG. 15, with various details disclosed in many of the other figures).

A. Modular and Universal Airplane Ground Support Equipment Cart

Airplane ground support equipment carts are wheeled, towable carts or fixed mounted (permanently or temporarily) devices that provide air conditioning, avionics equipment liquid cooling, and electrical power conversion and generation services to airplanes whose engines are shut down. These carts preferably should be conveyed by military and other airplanes to airports and military bases all over the world, so it would be convenient and an advantage to have this equipment be no larger than a standard military equipment conveyance palette. However, many such carts today do not fit one standard palette, and this reduces the numbers of ground support equipment that is available in the field. Traditionally, such ground support equipment carts are custom-designed—they provide such services to only one type or class of airplane. Hence, different carts must be provided for each different type of airplane. Also traditionally, the air conditioning components mounted on such carts are so bulky that they occupy the entire area of the cart, making it necessary to sandwich electrical power conversion and other components wherever there is room and thereby making it extremely awkward to service or replace such cart-mounted components.

The present invention is embodied in a universal airplane ground support equipment cart—universal in the sense that it is designed to service the varied needs of a variety of types and classes of airplanes, rather than just one type or class. This ground support equipment cart is also modular—its components are rectangular modules that may be easily separated or removed from the cart for service or exchange. The modules may also be used independently of the cart, and modules not needed for a particular type of airplane may be readily removed and used elsewhere, standing by themselves, in a highly flexible manner. Such a cart 10 and several of its modules—an electrical power generation module 14, an electrical power conversion module 20, and a dual air conditioning module 400 (which also provides PAO liquid cooling)—are illustrated in simplified form in FIGS. 1-3. (Much more detailed drawings of these components are included in this application and also in the related applications cited above).

In use, the cart 10 is mounted near or drawn up to an airplane (not shown) by a suitable tractor or truck (not shown). An operator connects an air conditioning plenum or air duct 26 from the dual air conditioning module 400 to a cooled air input port (not shown) on the airplane. And if the airplane has avionics or other electronic components that require a supply of liquid coolant, then the operator also connects a pair of PAO liquid coolant conduits 28 from the air conditioning module 400 to a pair of PAO ports on the airplane. The operator then uses a suitable electrical power cable (not shown) to connect an electrical power output port or receptacle (not shown in FIGS. 1-3) on the electrical power conversion module 20 to a matching port or cable on the airplane. To supply the varying needs of different types of airplanes, there may be as many as two electrical power conversion modules 20 the cart 10, a first module 20 having both a 115 volt, 400 Hz AC power output port and also a separate 270 volt DC power output port, and a second module 1308 (FIG. 13) having a 28 volt DC power output port (one or the other of these modules 20 or 1308 may be removed from the cart 10).

Figure 13:
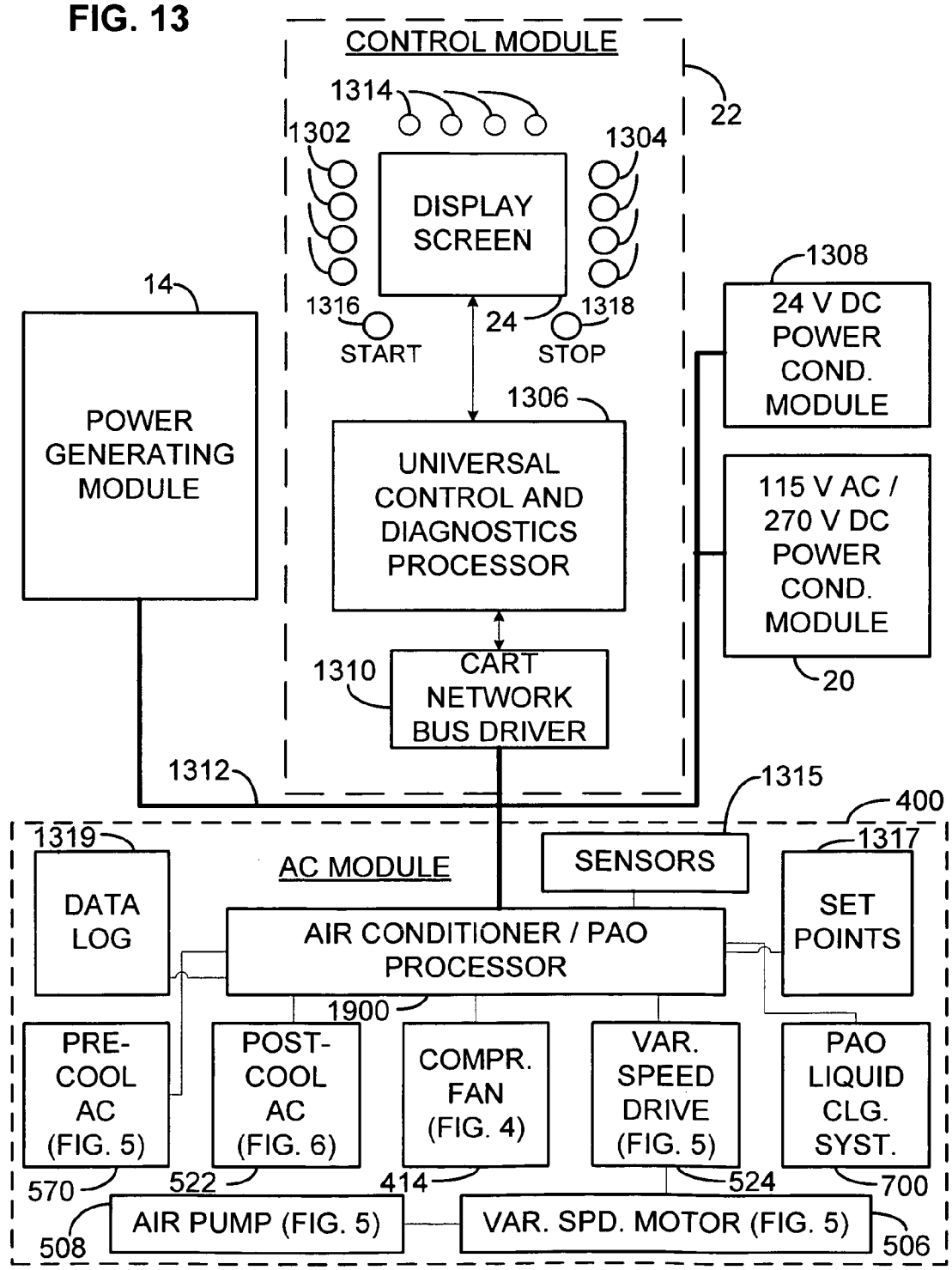
FIG. 13 is a block diagram illustrating the signal-carrying bus and the way in which it interconnects the power generating module, two power converter modules, and the two-stage air conditioning module with a control module that includes a display screen with eight pushbuttons and a universal control and diagnostics processor.
Figure 21:
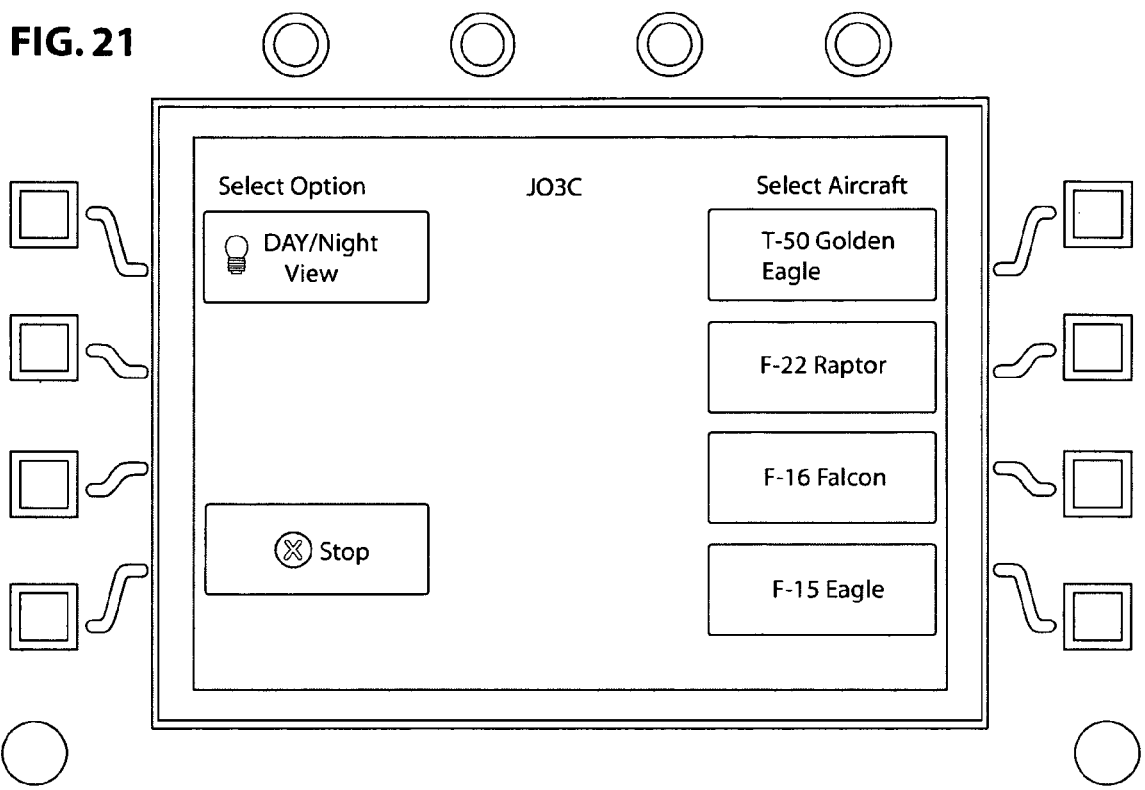
FIG. 21 presents a view of the main menu.
Figure 23:
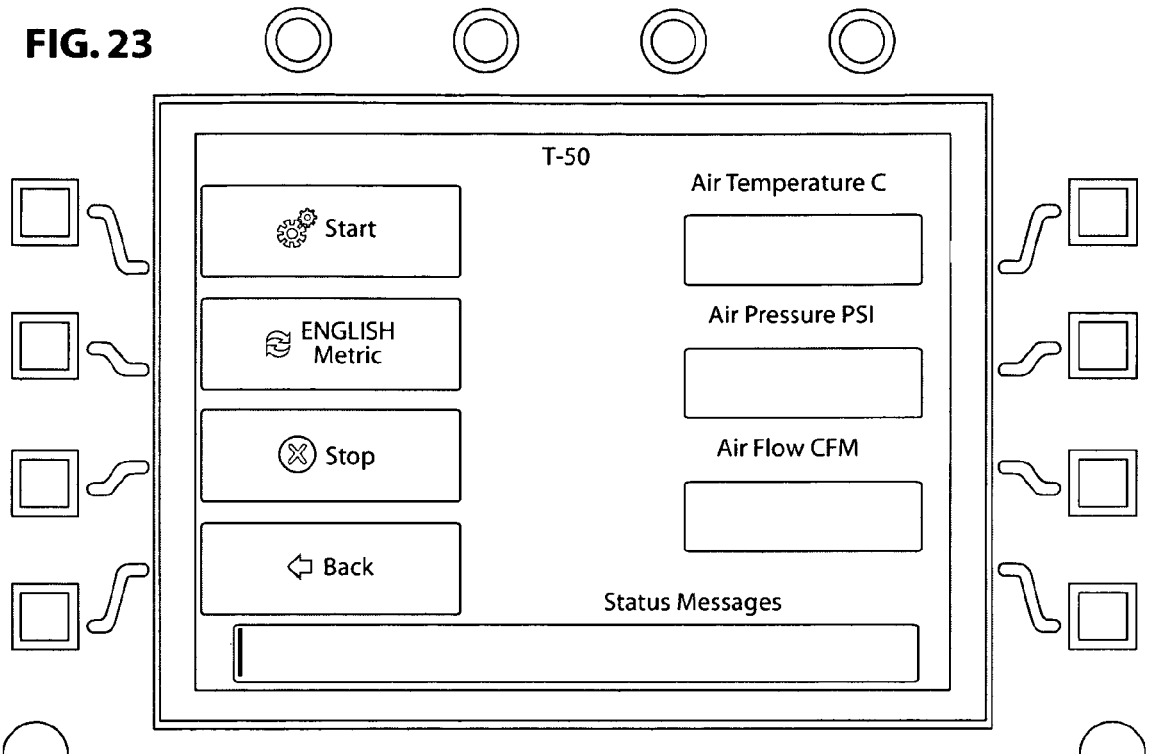
FIG. 23 presents a view of a menu that appears when the airplane "T-50 Golden Eagle" is selected on the main menu shown in FIG. 21.

Next, with reference to FIG. 13, the operator depresses a "Start" pushbutton 1316 on the front panel of a control module 22 having a display screen 24 that then displays a main menu such as that shown in FIG. 21. If the airplane is a T-50 Golden Eagle, the operator depresses one of four pushbuttons 1304 that is adjacent the label "T-50 Golden Eagle" on this menu (FIG. 21), and then the operator depresses one of four pushbuttons 1302 that is adjacent the label "Start" on a "T-50" menu that then appears (FIG. 23). In response, all of the modules automatically reconfigure themselves as needed to service this specific type of airplane with air conditioning of the proper pressure and volume of air, with electrical power of the proper type, voltage, and frequency, and with liquid coolant (if needed). If the operator selects the wrong type of airplane, pressure and air flow measurements can detect this and shut down the system, illuminating a colored status light 1314 to signal an error and displaying an appropriate error message on the control panel 24 to the operator. The system is halted when the operator depresses a "Stop" pushbutton 1318 on the front of the control 22 or a pushbutton 1302 or 1304 that is adjacent the label "Stop" on one of the display screen 24 menus.

A universal airplane ground support equipment cart is designed to provide flexible support for the needs of many different types and classes of airplanes having widely varying air conditioning and liquid cooling and electrical power support needs. The present invention can provide different pressures and volumes of cooled air and cooled liquid to different airplanes, and it can provide different types and quantities of electrical power to different airplanes. It also provides a simplified, integrated control panel where airplane service personnel can simply select the type of airplane that is to be serviced and have the various appliances on the cart automatically configured to optimize the support for that particular type of airplane.

A modular airplane ground support equipment cart is one where the different support systems provided by the cart are each confined to rugged, compact, optionally EMI shielded, rectangular modules that may be easily removed, serviced, replaced, and used stand-alone separate from the cart and its other modular components.

In the cart 10, for example, a two-stage air conditioning module 400 contains all of the air conditioning components of the cart 10, including a liquid PAO cooling system. An electrical power converter module 20 contains the power conversion components of the cart 10, including a 270 volt D.C. supply and a 115 volt 400 Hz A.C. supply; and the module 20 may be replaced or supplemented with another module 1308 (FIG. 13) that includes a 28 volt D.C. supply, providing up to three different types of electrical power conversion in accordance with the specialized needs of different types and classes of airplanes.

A power supply module 14 contains a diesel engine and a generator for producing 60 cycle, three-phase, 460 volt electrical power when the cart cannot be conveniently hooked up to a 360 to 500 volt, 50 or 60 cycle A.C., three phase supply provided by the local power grid. The power supply module 14 is confined to one end of the cart 10 and may be detached from the cart 10, as is illustrated in FIG. 2.

Any or all of these modules 14, 20, 400, and 1308 may optionally be equipped with an internal transformer (not shown) that transforms the incoming high voltage electrical power down to 120 volts or 240 volts at 50- or 60-Hz and feeds this low voltage to standard, weather protected outlets (not shown) which can be used to provide power to hand tools and to portable lighting equipment and the like, with ground fault protection also provided to these appliances.

As is illustrated in FIG. 13, a control module 22 is mounted on the cart 10 above the power converter module 20. The control module 22 has on its front panel a pair of start and stop pushbuttons 1316 and 1318, colored status lights 1314, and a display screen 24 having sets of four pushbuttons 1302 and 1304 positioned adjacent the display screen 24's left and right sides. When turned on, the display screen 24 presents a main menu display, shown in FIG. 21, which permits airplane maintenance personnel to select the type of plane that is to be serviced by depressing one of the adjacent pushbuttons 1302 and 1304. A maintenance menu display, shown in FIG. 25, permits service personnel to view and (in some cases) to alter the state of the air conditioning and PAO module 400, the electrical power converter modules 20 and 1308, and the power supply module 14. As is illustrated schematically in FIG. 13, all of the modules 14, 20, 22, 400, and 1308 are automatically networked together by a network 1312 when they are installed upon the cart 10. In addition, each of the modules 14, 20, 22, 400, and 1308 is equipped with a network jack (not shown) that can be connected to an external portable computer (not shown) which can then serve as the control module and display for all of the modules, with mouse clicks on the menus shown in FIGS. 20 to 28 replacing depressions of the pushbuttons 1302 and 1304.

The cart 10 is optionally mounted upon two wheel and axle truck assemblies 18 and 19. In the space on the cart 10 between the power generation module 14 and the two-stage air conditioning module 400, one or both of the electrical power converter modules 20 and 1308 may be slid into place and attached to the cart 10, as is illustrated in FIGS. 2 and 3. (If both are installed, they may be on opposite sides of the cart, as shown, or they may be installed one above the other.)

If the power generation module 14 is not required for a particular airplane support task, the module 14 and the wheel and axle truck assembly 19 beneath the module 14 may be completely detached from the rest of the cart 10, as is illustrated in FIG. 2, and removed to be used entirely separately elsewhere, wherever a portable source of 60 Hz, 460 volt, three-phase power is required. As illustrated in FIGS. 2 and 3, the electrical power converter modules 20 and 1308 may be slid out on tracks and locked in position to give service personnel convenient access for the servicing of these modules 20 and 1308 and their internal electrical and electronic components. They may also be removed for repair or for use elsewhere as stand-alone power converters, or they may be replaced with different power converter modules that generate different voltages and frequencies as needed for servicing different airplanes.

B. Two-Stage Air Conditioning and PAO Liquid Cooling System

The two-stage air conditioning system and PAO liquid cooling system that is described below has many valuable attributes. Among others: It can achieve a 30-second air conditioner startup, rather than the many minutes that are required to start up conventional airplane ground support equipment air conditioners, due to the close control that is exerted over all aspects of the system and inherently low refrigeration system charge by minimizing internal volume of the refrigeration system (see FIG. 15 and the accompanying descriptive material presented below). Since the digital control algorithms may be varied dynamically by the processor 1900 to suit unusual conditions, the air conditioner can still operate even if many sensors and controllers are inoperative based upon memory of past operations which can be relied upon to predict conditions in place of actual sensor readings to give control guidance. And as will be explained, an operator indicates on a menu (FIG. 18) which type or class of airplane is to be serviced. If, when the air conditioner is started up initially at a lower blower speed than the final blower speed, the pressure and air flow measurements captured by the temperature, pressure, and power consumption measurement sensors do not correspond to that choice of type or class of airplane, the air conditioner can shut down and give the operator an appropriate warning message that the wrong type of airplane has most likely been selected. Other examples of the system's attributes are set forth below. An improved user interface is presented in an appendix to this application, where start and stop buttons and colored lamps are added to the display to improve its usability and the menus are adjusted accordingly.

Figure 4:
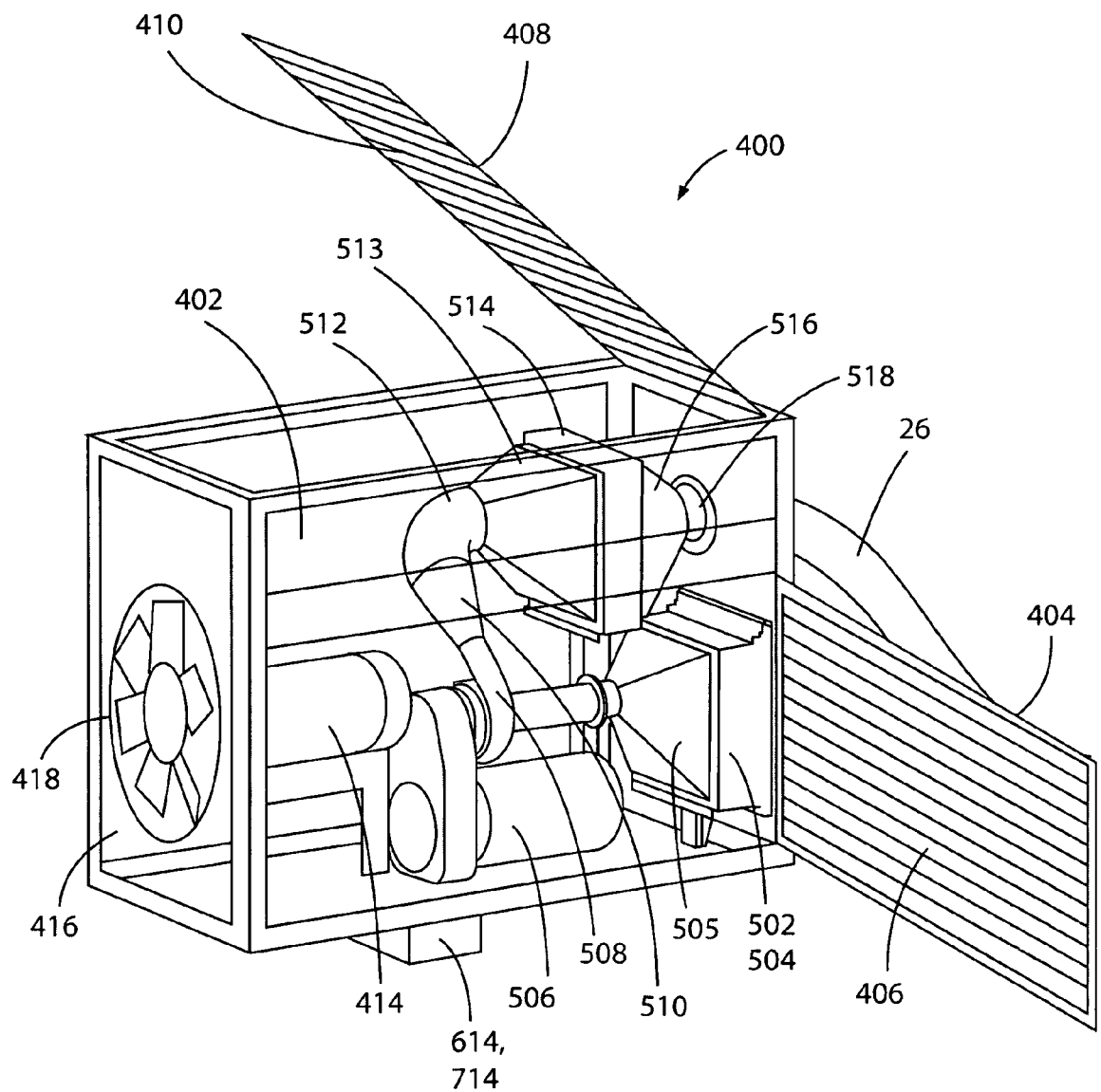
FIG. 4 is a perspective view of a two-stage air conditioning module that is mounted on the front portion of the cart shown in FIG. 1, the air conditioning module shown with both of its microchannel condenser coil supporting doors shown swung open to reveal its internal structural details.
Figure 5:
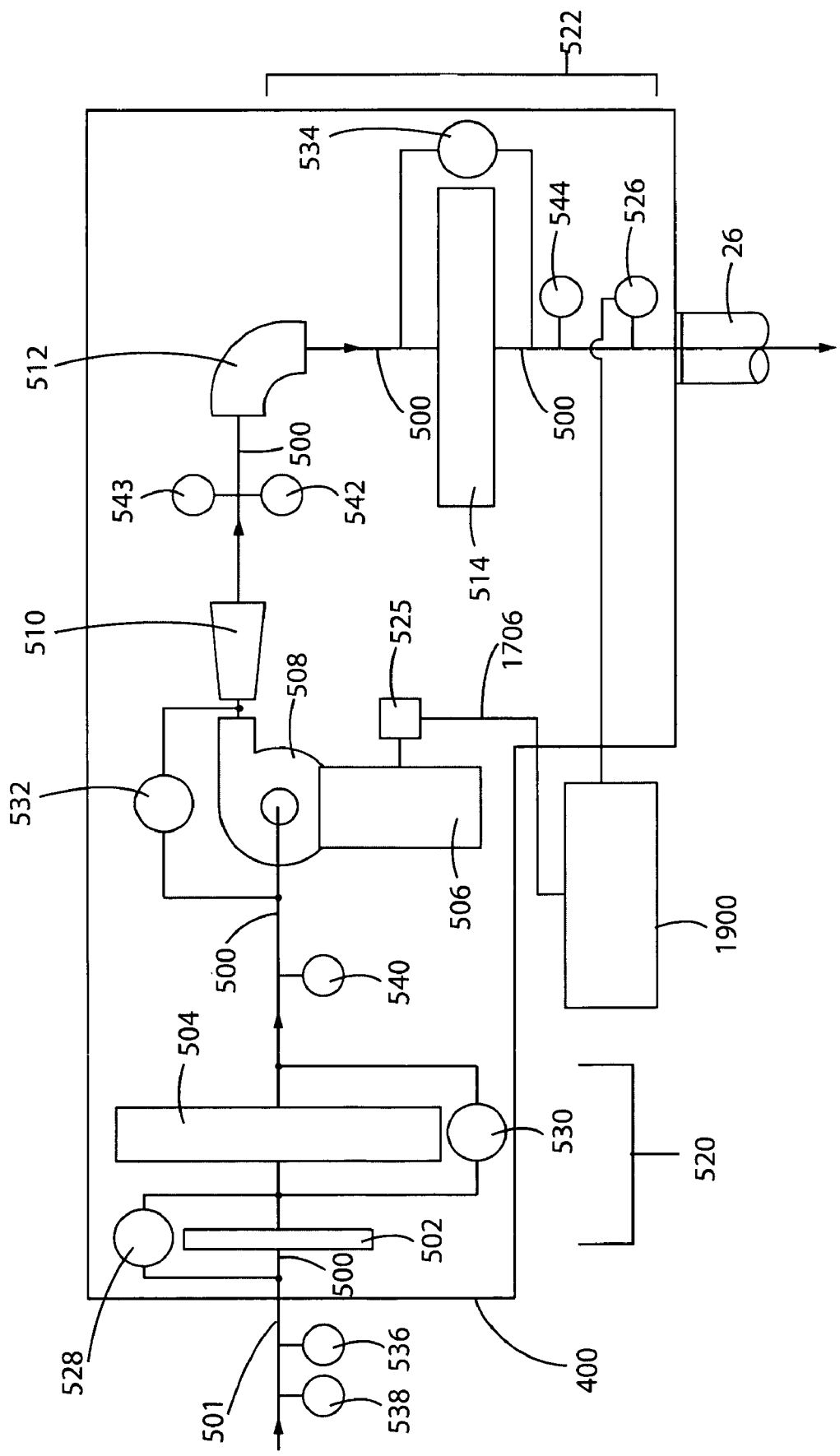
FIG. 5 is a schematic diagram illustrating the flow path of air as it flows through the two-stage air conditioning module shown in FIG. 4.
Figure 6:
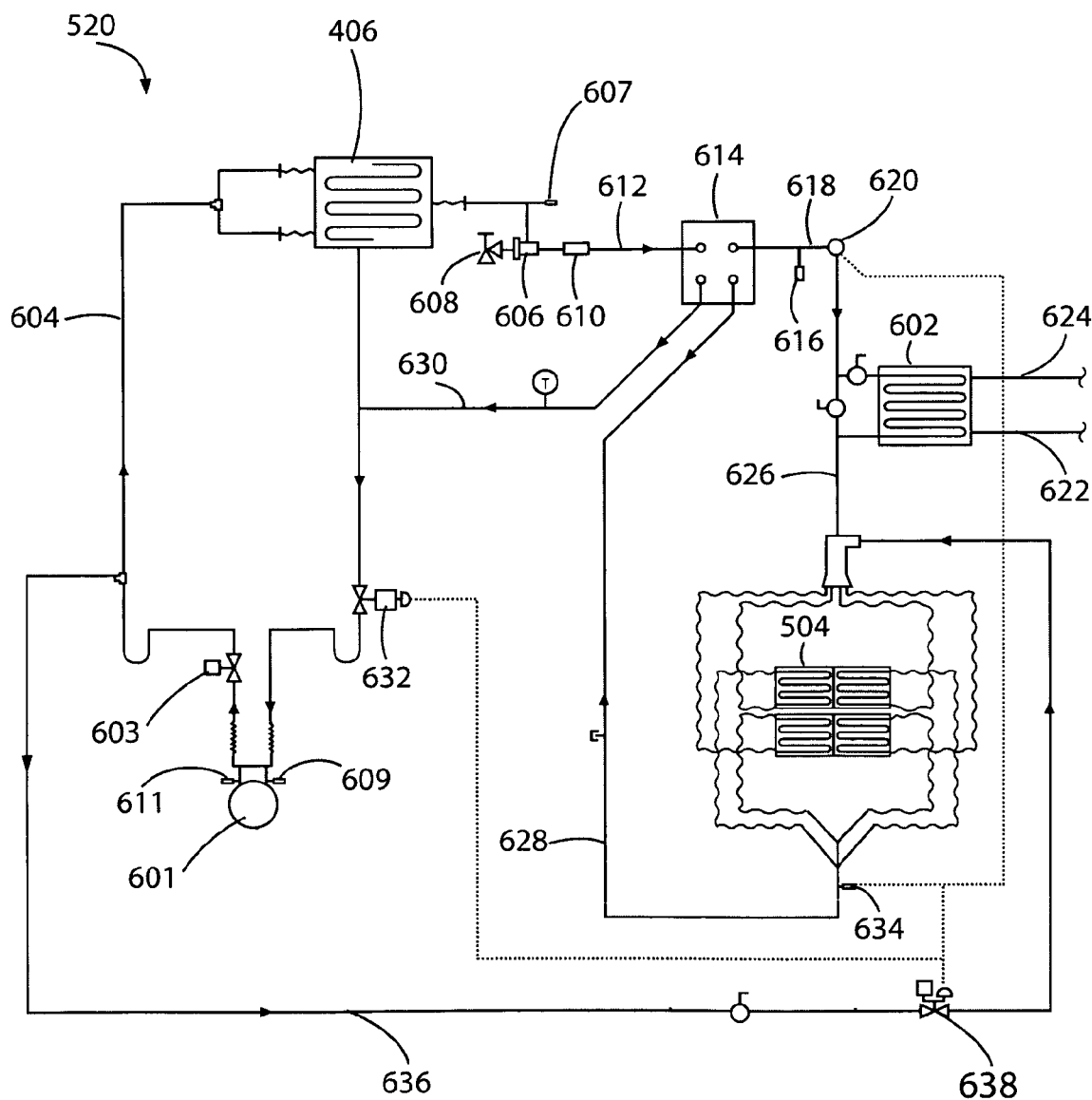
FIG. 6 is a schematic diagram illustrating the refrigerant circulation paths within the first, or "pre-cool," air conditioning unit within the two-stage air conditioning module shown in FIG. 4, and also showing a heat exchanger which transfers heat from a separate PAO cooling system (not shown) to the refrigerant within this first air conditioning unit.
Figure 7:
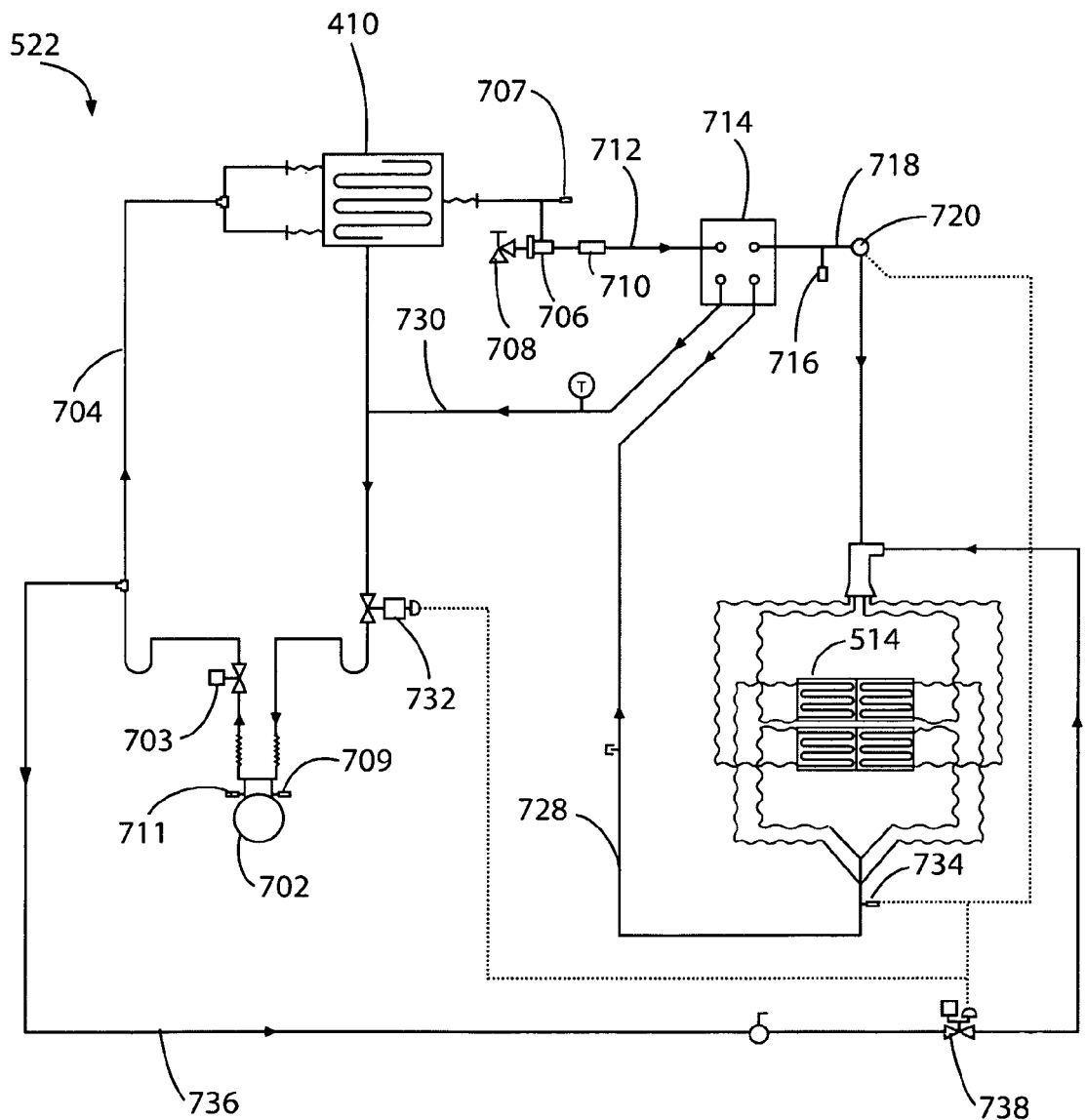
FIG. 7 is a schematic diagram illustrating the refrigerant circulation paths within the second, or "post-cool," air conditioning unit within the two-stage air conditioning module shown in FIG. 4.
Figure 8:
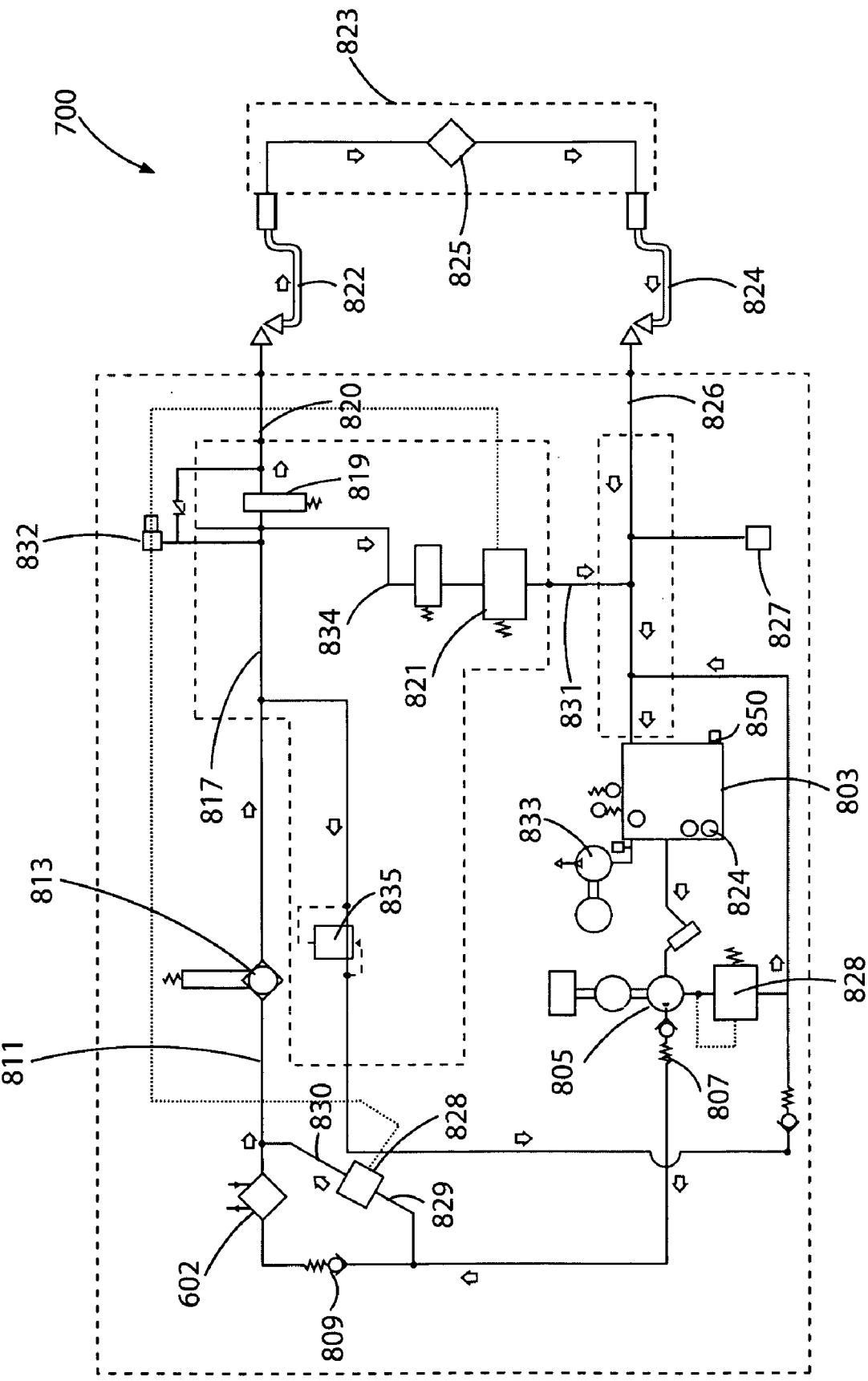
FIG. 8 is a schematic diagram of a PAO cooling system within the air conditioning module shown in FIG. 4 which transfers heat from an airplane to the first, or "pre-cool," air conditioning unit within the two-stage air conditioning module shown in FIG. 4.
Figure 9:
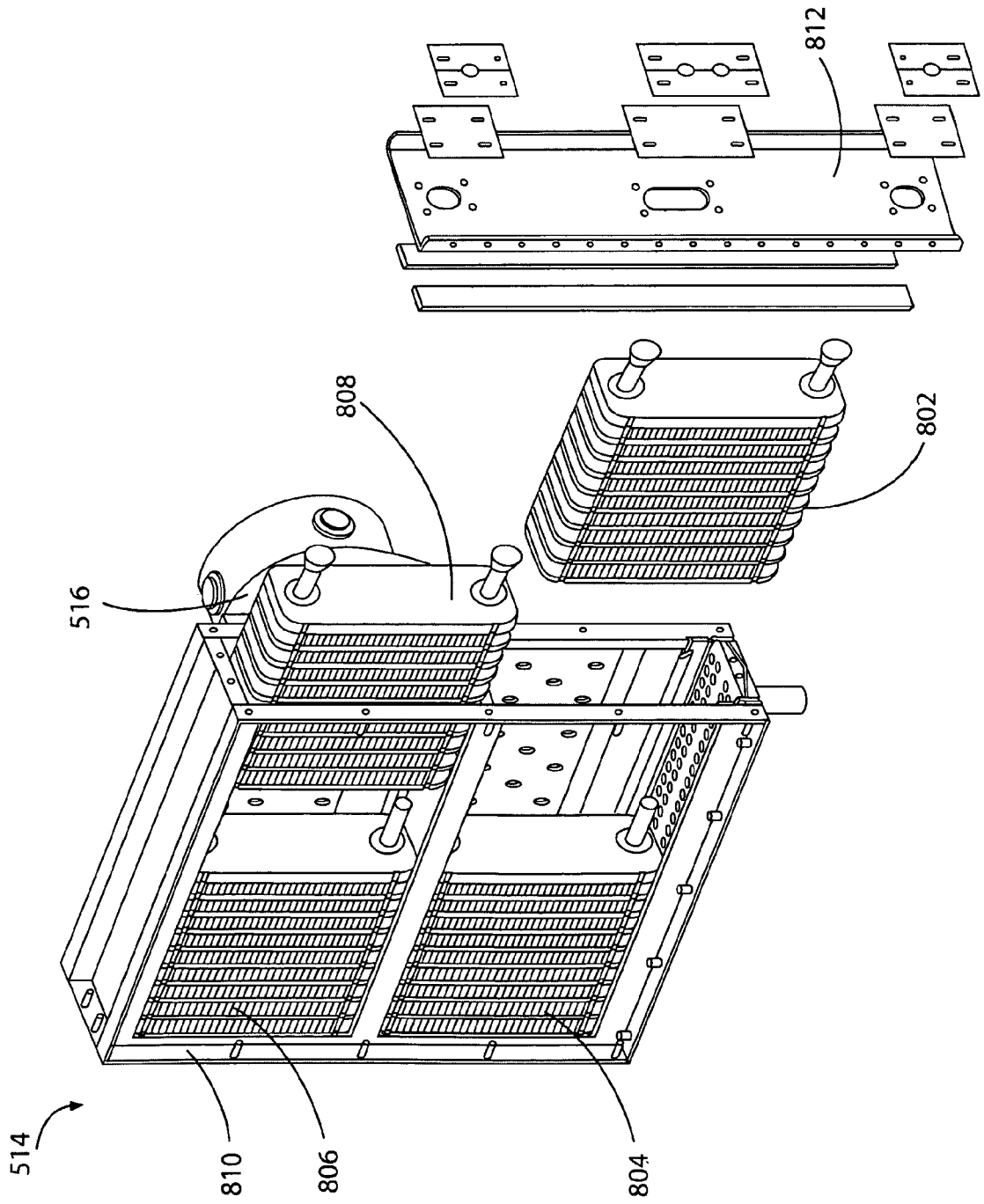
FIG. 9 presents an exploded, perspective view of four plate fin evaporator coils assembled into a square array, mounted within a rectangular frame, and attached to a funnel-shaped duct that conveys cooled air to the external piping which leads to an airplane.
Figure 10:
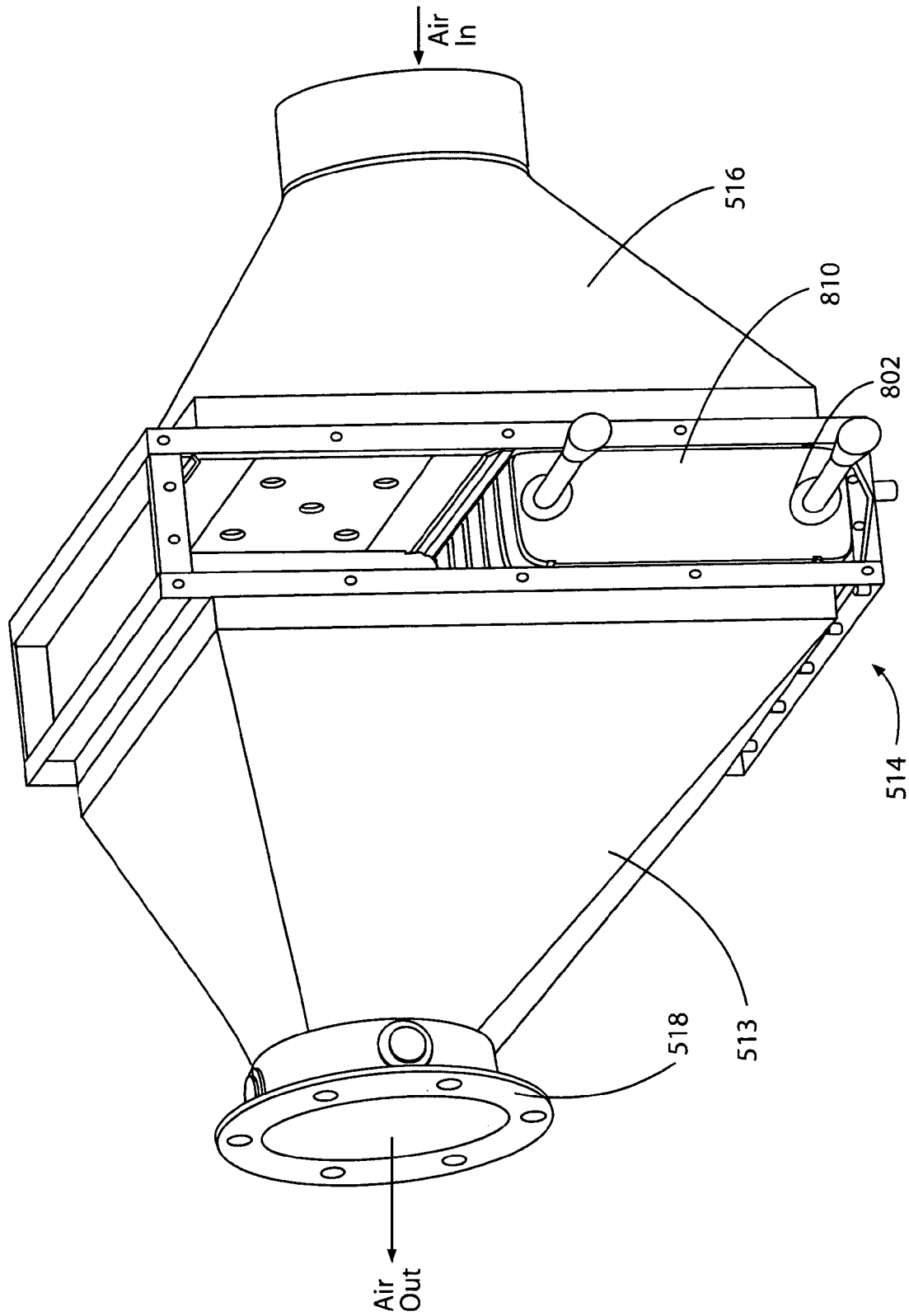
FIG. 10 presents a perspective view of the assembly of plate fin evaporator coils shown in FIG. 9 mounted between two funnel-shaped ducts that spread the air to be cooled uniformly across the surface of the plate fin evaporator coils.
Figure 11:
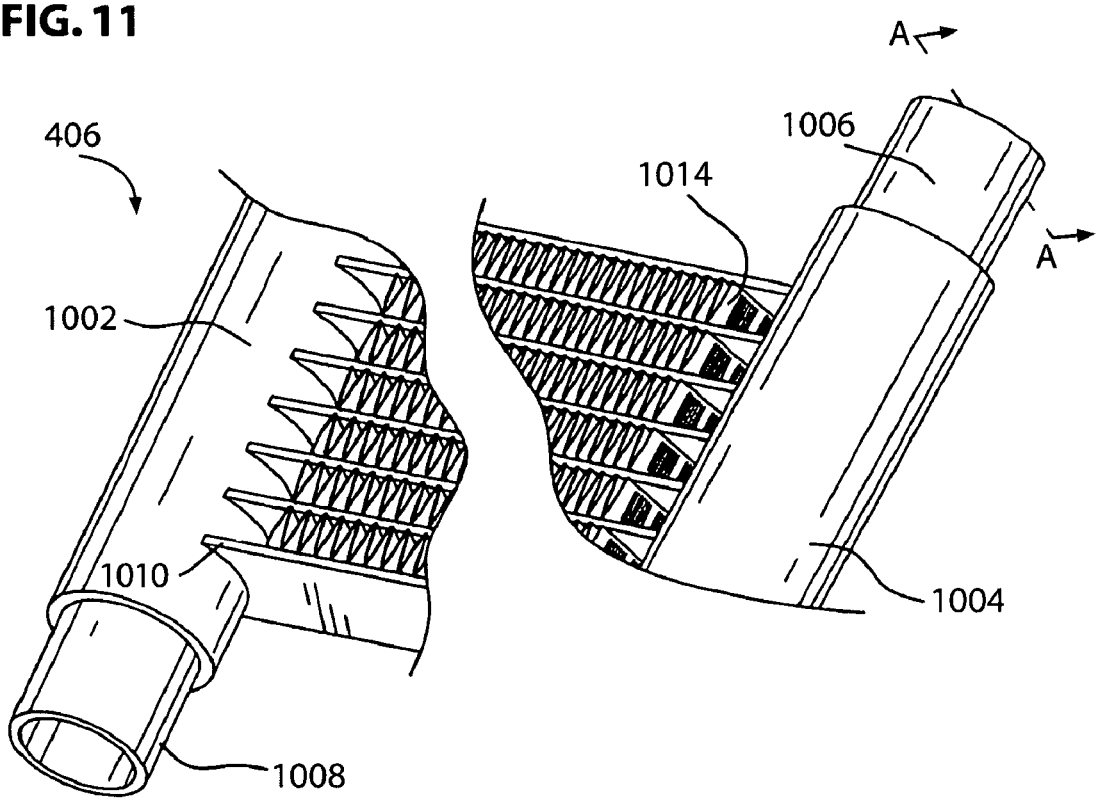
FIG. 11 presents a perspective view of a microchannel condenser unit of the type used in pairs and mounted upon the two doors of the two-stage air conditioning module shown in FIG. 4.
Figure 12:
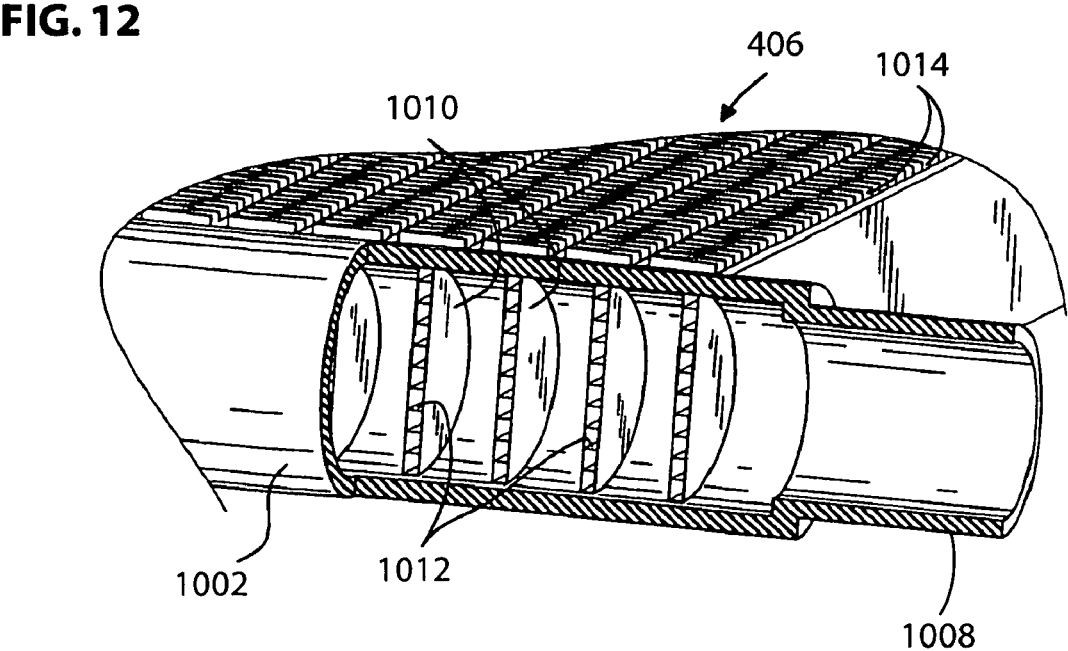
FIG. 12 presents a partly sectional view, taken along the lines A-A in FIG. 10, of a microchannel condenser unit illustrating interior details of the air channels.

Referring now to FIGS. 4 through 12, the internal mechanical and fluid flow path details of the two-stage air conditioning module 400 are shown. The module 400 contains two air conditioning stages—a pre-cool air conditioner 520 (shown in FIGS. 5 and 6) and a post-cool air conditioner 522 (shown in FIGS. 5 and 7). The flow of air along a path 500 through the two air conditioners 520 and 522 stages are described in FIG. 5. The flow of coolant through the two air conditioners 520 and 522 stages are illustrated in FIG. 6 (pre-cool air conditioner 520) and in FIG. 7 (post-cool air conditioner 522). The pre-cool air conditioner 520 has associated with it a PAO liquid cooling system 700. FIG. 8 illustrates the flow of avionics liquid coolant through this PAO liquid cooling system 700 and between the system 700 and avionics 825 within an airplane 823. The mechanical details of each of the air conditioner's plate fin evaporator arrays are illustrated in FIGS. 9 and 10, and the mechanical details of each of the air conditioner's micro-channel condenser coils are illustrated in FIGS. 11 and 12.

FIG. 4 presents a perspective view of the two-stage air conditioning module 400 as seen from its rear side 402, with the air duct 26 that conveys air conditioned air to the airplane (not shown) shown extending to the right (in FIGS. 1 and 2, the air duct 26 extends to the left). The side 402 is accordingly the side of the module 400 that is not adjacent the electrical power converter modules 20 and 1308 and the control module 22 when these modules 400, 20, 22, and 1308 are all mounted on the cart 10, as shown in FIG. 1. Accordingly, the module 400's rear side 402 is always accessible for servicing the module 400 and is not blocked by the presence of the other modules.

A hinged, louvered door 404 is shown swung open from the rear side 402 (FIG. 4) of the module 400, and this door gives service personnel unfettered access to all the air conditioning and PAO components within the module 400 for service and maintenance procedures, but would not be left open during operation. A second hinged, louvered door 408 is shown swung upwards from the top side of the module 400. This door 408 gives service personnel access to the PAO system 700 components which are mounted near the top of the module 400.

Figure 15:
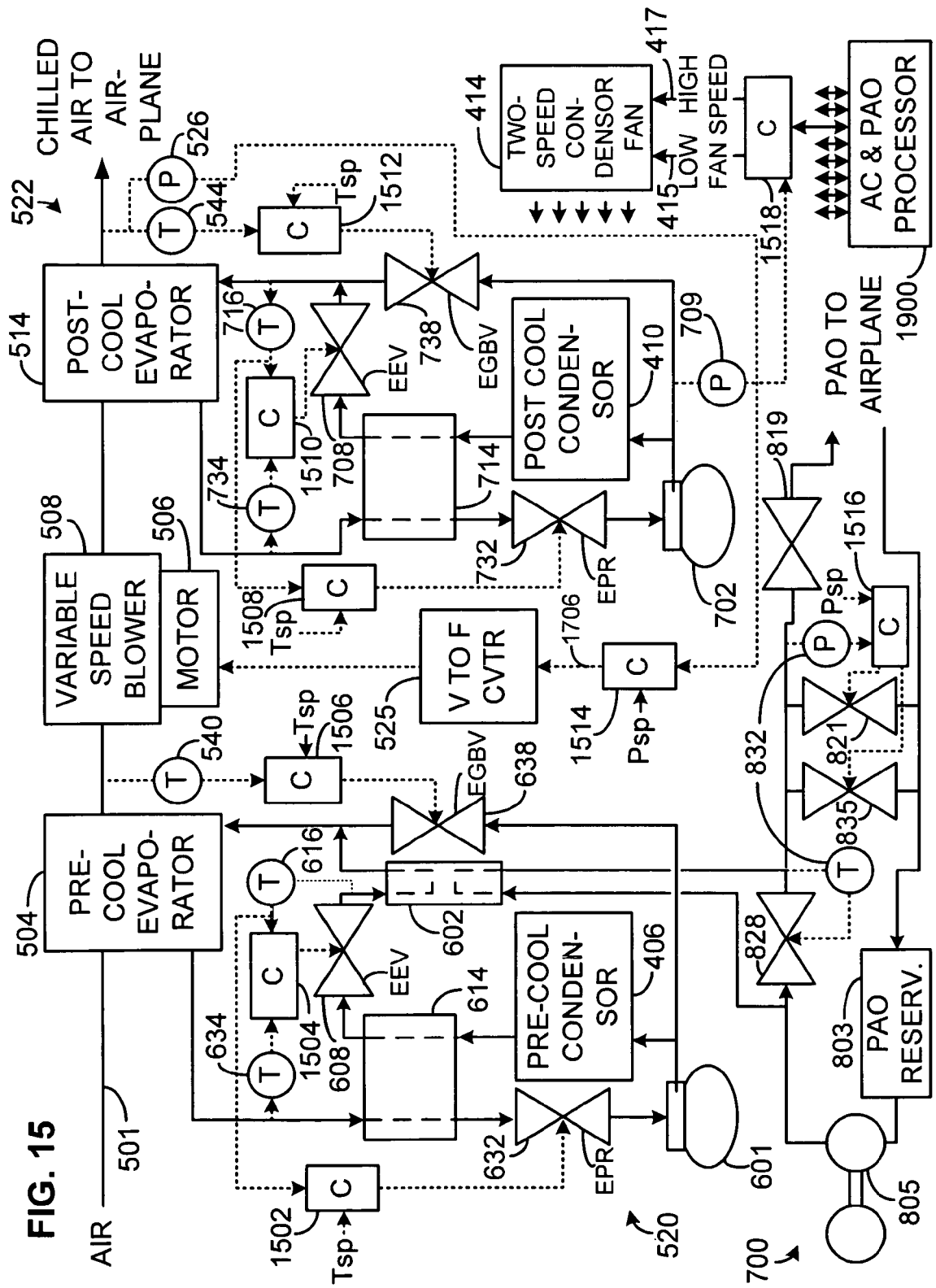
FIG. 15 is a simplified schematic diagram (combining elements taken from FIGS. 5, 6, 7, and 8) illustrating the air flow and the refrigerant circulation paths in the pre-cool and post-cool air conditioning units and also in the PAO cooling system, and identifying in particular the eight feedback control loops and controllers that control the operation of these systems and also the temperatures and pressures and setpoints that provide input signals to these controllers.
Figure 18:
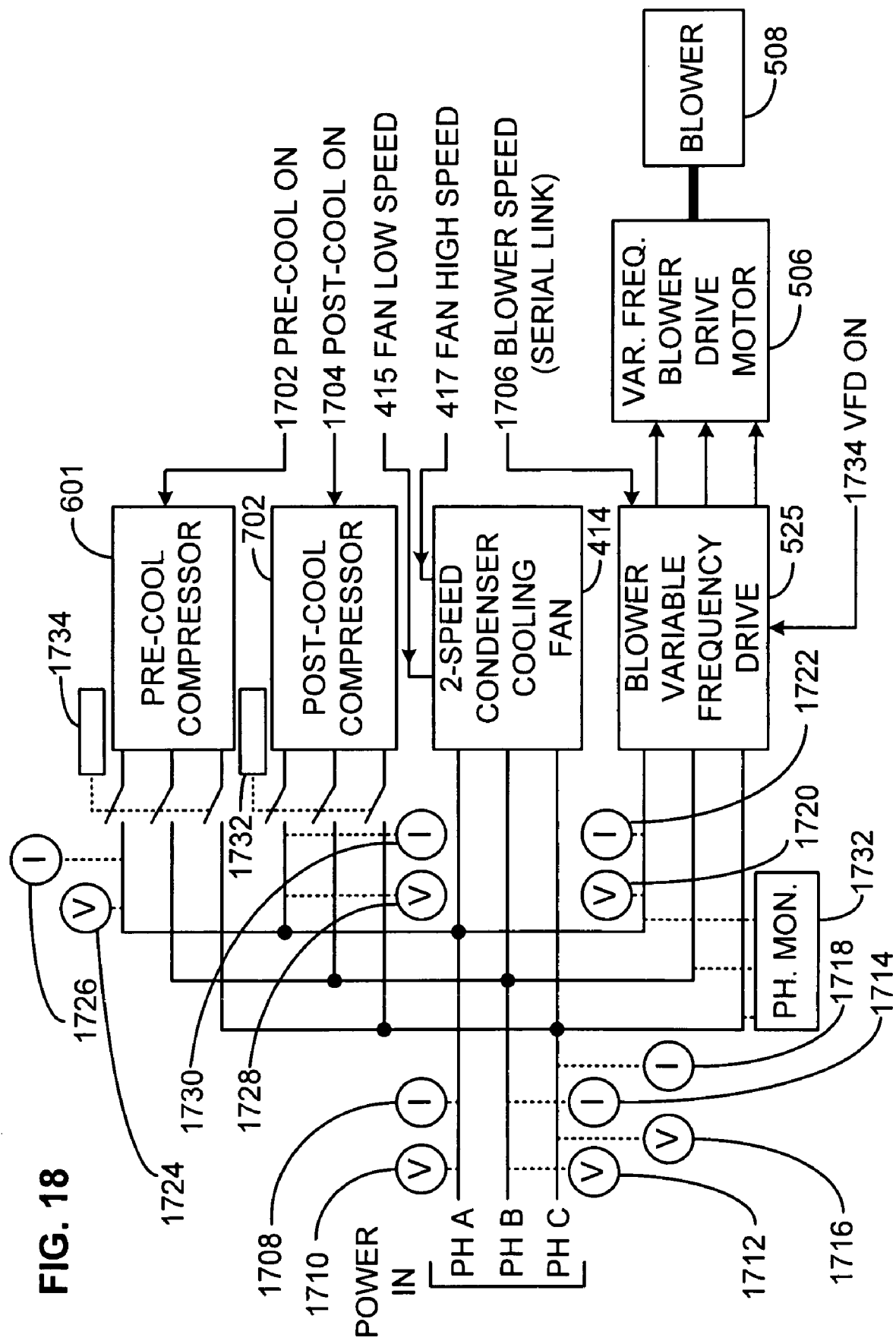
FIG. 18 is a schematic diagram showing the connection of the two compressors, the two-speed condenser cooling fan, and the blower fan's variable frequency drive to a three-phase source of 380 to 500 volt, 50 to 60 Hz electrical power and also showing control signals for the compressors, cooling fan, and blower fan.

The two louvered doors 404 and 408 each support a pair of thin, microchannel air conditioner condenser coils 406 and 410 the details of which coils are shown in FIGS. 11 and 12 (discussed below). Each pair of two condenser coils 406 and 410 is associated with a respective one of the two air conditioners 520 and 522 stages mounted within the air conditioning module 400. A two-speed condenser fan 414 blows air out of a fan portal 418 in one side 416 of the air conditioning module 400—the side that is not connected by the air duct 26 to the airplane. When both the doors 404 and 408 are closed, the condenser fan 414 sucks air through both of the pairs of microchannel condenser coils 406 and 410, cooling the refrigerant within the two condenser coils 406 and 410. The fan 414 blows the air heated by passage through the two condenser coils 406 and 410 out the fan portal 418 on the side 416 of the cart 10 away from where service personnel viewing the display screen 24 or connecting up the air duct 26 or the PAO liquid coolant conduits 28 would normally stand. With reference to FIGS. 15 and 18, the fan 414 has low speed 415 and high speed 417 fan control signals which are generated by a controller 1518 which is implemented as an algorithm within the air conditioning and PAO processor 1900. The controller responds to the ambient temperature and to various temperature and pressure signals shown in FIGS. 5, 6, and 7 by varying the fan 414 from off to low speed to high speed as needed to aid the processor in maintaining the proper operation of the two air conditioners 520 and 522. This is another way for the system to adjust rated capacity, a way that is especially useful when the system is running at low capacities—that is, at low ambient conditions.

FIG. 5 presents a schematic diagram of the air pathway 500 taken by air which is cooled, dehumidified, and compressed as it passes through the two-stage air conditioning module 400. Outside air shown at 501 is sucked through the pre-cool air conditioner 520 by a blower 508 which then propels the air through the post-cool air conditioner 522 and through the air duct 26 from which it emerges as a stream of cooled, dehumidified, pressurized air that flows directly into the airplane (not shown).

The pre-cool air conditioner 520 includes as components a first evaporator array 504 (FIGS. 4 and 5) and a pair of the microchannel condenser coils 406 (FIG. 4) plus other components all of which are shown together in FIG. 6 (described below). The post-cool air conditioner 522 includes as components a second evaporator array 514 (FIGS. 4 and 5) and a second pair of the microchannel condensers 410 (FIG. 4) plus other components all of which are shown in FIG. 7 (described below). The two air conditioners 520 and 522 are essentially identical except that the pre-cool air conditioner 520 includes a PAO heat exchanger 602 (FIGS. 6 and 8) that absorbs heat from the PAO liquid coolant circuit 700 shown in FIG. 8.

Referring now to FIGS. 4 and 5, air 501 that is to be dehumidified and cooled flows along the air pathway 500 first through an air filter 502 and next through the pre-cool air conditioner's 520 plate fin evaporator array 504, where the air is partially cooled and dehumidified. The air next flows through a narrowing plenum 505 (FIG. 4) and then onwards to the blower 508, which propels the air forward at increased pressure. The air next passes through an outlet cone 510 (FIG. 4) designed to convert velocity pressure coming from the blower 508 into static pressure (static regain) before making a turn through an elbow 512 (FIG. 4). The air then flows into an expansion chamber or air funnel 513 (FIG. 10) which contains a baffle plate that spreads out the air so that the air passes uniformly through all parts of the post-cool air conditioner 522's plate fin evaporator array 514. The further cooled and dehumidified air then flows through a narrowing plenum 516 (FIGS. 4, 9, and 10) and through a circular coupling 518 (FIGS. 4, 9, and 10) out the air duct 26 (FIGS. 1, 4, and 5) and onwards to the interior of the airplane (not shown).

The blower 508 is driven by a variable-speed electric motor 506 the speed of which motor is controlled by the frequency of the motor 506's incoming electric power. A voltage-to-frequency converter 525 accepts a serialized digital control signal 1706 which specifies the motor 506's frequency and which is supplied by an air conditioner and PAO processor 1900 (a real-time process control computer system—see FIG. 19). The converter 525 responds to that signal 1706 by varying the frequency of the input power to the motor 506 up and down in accord with the frequency called for by the control signal 1706 based upon a control algorithm that monitors the output pressure (measured by the pressure sensor 526). The processor 1900 receives a 0-to-10 volt pressure measurement signal from a pressure sensor 526 that measures the pressure within the ring 518 and air duct 26 that supplies cooled air to the airplane (not shown). With reference to FIGS. 5 and 15, the processor 1900 compares the pressure read by the pressure sensor 526 to a set-point desired pressure, which may vary from one type and class of plane to the next, and then adjusts the control signal 1706 so as to adjust the blower 508's speed to a setting that maintains the pressure within the air duct 26 at or close to the proper pressure that is required to cool the particular type or class of airplane.

In FIG. 15, a controller 1514 is shown symbolically comparing a setpoint pressure Psp to the air duct pressure measured by the pressure sensor 526 and then generating the signal 1706 which controls the blower 508 speed. The controller 1514 is actually implemented digitally within the processor 1900. The controller 1514 would typically have a proportional component to minimize the pressure error and an integral component to drive that pressure error towards zero over time. The airplane selection process, described below in conjunction with the selection menu shown in FIG. 21, can alter the pressure setpoint Psp value as well as other temperature setpoint Tsp values (described below) to customize the air conditioner and PAO controllers shown in FIG. 15 to the specific needs and requirements of differing types and classes of airplanes. When one of the pushbuttons 1304 adjacent the display screen 24 (FIG. 13) is depressed, for example, to program the modules on the cart 10 to service the T-50 Golden Eagle (see FIG. 21), the optimal temperature Tsp and pressure Psp setpoints for that airplane are selected by the air conditioning and PAO processor 1900 and are placed into a memory of setpoints 1317 (FIG. 13).

Figure 17:
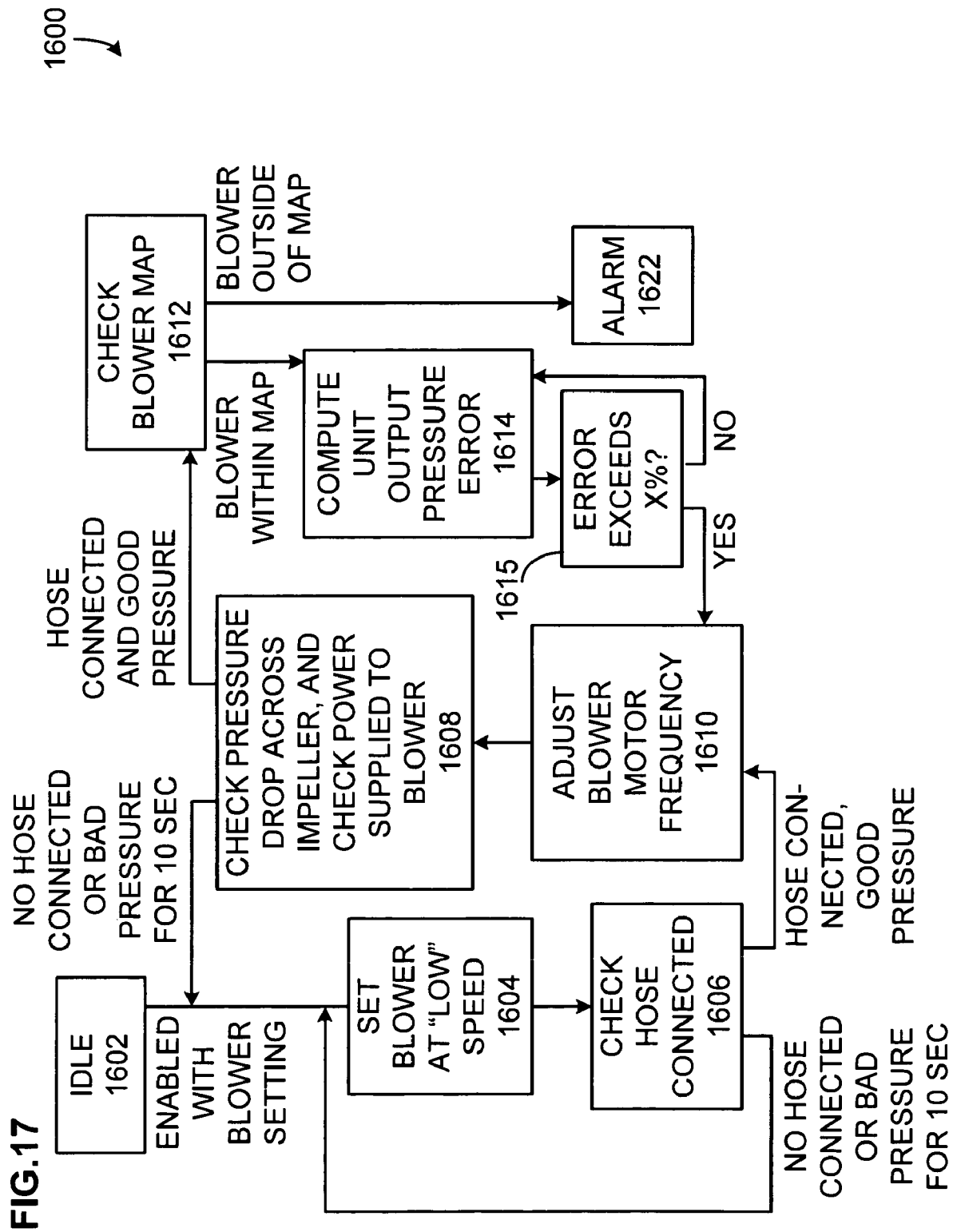
FIG. 17 is a flow diagram illustrating how the operation of the blower fan which blows air through the two air conditioner units and into the airplane is automatically controlled through the use of a variable frequency drive for the motor that drives the blower fan.

FIG. 17, which is described below, describes other aspects of the blower 508 control algorithm in somewhat greater detail.

Differential pressure sensors 528, 530, 532, and 534 enable the processor 1900 to monitor the pressure drop across various air conditioning system components. These pressure readings are collected by the processor 1900 and saved in a data log 1319 (FIG. 13) and are used later on for maintenance purposes. For example, an excessive pressure drop across the air filter 502 measured by the differential pressure sensor 528 signals that it soon will be time to clean or replace the air filter 502. Excessive pressure drop across the evaporator arrays 504 or 514 measured by the differential pressure sensors 530 and 534 can signal icing of an evaporator array that is running too cold or a clogged evaporator array that requires cleaning. The pressure drop across the blower 508, when compared to the signal 1706 frequency value and also the electrical power applied to the blower 508 (as measured by voltage sensor 1720 and current sensor 1722 both shown in FIG. 18) can indicate the condition of the blower and its motor and whether servicing is needed. This information is saved in the processor 1900's data log 1319 (FIG. 13).

Pressure sensor 536 (see FIG. 5) monitors the outside air pressure, which is recorded by the processor 1900 in the data log 1319. Pressure sensor 543 (FIG. 5) monitors the output air pressure generated by the blower 508 which is also the air pressure within the air plenums, a pressure that can also be recorded by the processor 1900 in the data log 1319. RTD (resistor temperature device) temperature sensors 538, 540, 542, and 544 monitor the air temperature before and after the air passes through the two evaporator arrays 504 and 514. These temperature measurements are fed into the processor 1900 which records them in the data log 1319 and can use them for predictive maintenance. As an option, some or all of these temperatures and pressures may be used to adjust the amount of cooling that is generated by each of the two air conditioners, as is illustrated in FIG. 15.

FIGS. 6 and 7 present detailed schematic diagrams of the pre-cool air conditioner 520 and the post-cool air conditioner 522. In one embodiment of the invention, the refrigerant tubing used in the construction of these air conditioners 520 and 522 is ACR copper tubing, with brazed joints and with many sweated fittings used to achieve a curved path of refrigerant flow. In another embodiment, aluminum tubing is used instead of copper tubing. A tube bender is then used in lieu of many sweated joints, and this reduces the number of parts used on each system, a great cost reducer. A great feature of aluminum is that it makes the system very lightweight and cost less when compared to copper, as aluminum weighs about 70% less than copper and cost approximately one-third as much. In addition, the use of flared fittings would also allow assembly to take place with pre-made lengths and tube configurations where the assembly technician would just need to turn a wrench instead of waiting for a skilled worker certified in copper brazing. This would also make field repairs much quicker than ever before.

FIG. 6 presents a schematic diagram of the pre-cool air conditioner 520. With reference to FIG. 6, a compressor 601 compresses the refrigerant and sends it along a path 604 to one of the pair of condenser coils 406, where the refrigerant is cooled by air flowing through the air conditioning module 400 under the impetus of the condenser fan 414, as was described above, where the refrigerant cools and becomes liquefied. The air conditioning and PAO processor 1900 (FIG. 19) sends out a first on/off pre-cool shutoff signal to a solenoid valve 603 and an on/off pre-cool compressor on signal 1702 which can turn the pre-cool compressor 601 on and off (see FIGS. 18 and 19) and which can shut down the pre-cool air conditioner 520 by shutting off the compressor 601 and isolating the compressor 601 from refrigerant migration by closing the solenoid valve 603. The shutdown algorithm will then close all the refrigeration valves 620, 638, and 632 (FIG. 6) to further prevent refrigerant migration back to the compressor 601.

The cooled and liquefied refrigerant next flows past a charging valve 608, a filter dryer 606, and a sight glass 610 over a path 612 to a brazed plate heat exchanger 614 (FIGS. 4 and 6) that is mounted at the very bottom of the air conditioning module 400, as is shown at 614 in FIG. 4. The brazed plate heat exchanger 614 has a multi-purpose in its design: it serves as a liquid refrigerant accumulator that collects any excess liquid refrigerant and any excess oil that may be in the suction line between the compressor 601 and the evaporator array 504 to prevent damage to the compressor 601 (which is designed to pump vapor). The brazed plate heat exchanger 614 also serves as a liquid suction line sub-cooler that sub cools the liquid refrigerant by allowing the expanded gasses flowing along the path 628 and 630 and entering the compressor 601 to absorb heat from the liquid refrigerant in the lines 612 and 618 and in the brazed plate heat exchanger 614. The liquid line side of the brazed plate heat exchanger 614 acts as a refrigerant receiver, accumulating excess refrigerant charge on the condenser side of the system. The brazed plate heat exchanger 614 increases the capacity and efficiency of the cooling system at high load conditions. Finally, the brazed plate heat exchanger is used to control the suction line superheat, allowing the evaporators to be fully flooded. Flooding the evaporators allows high cooling capacity from the evaporators as well as increasing the evaporator capacity while maintaining higher refrigerant temperature which helps avoid evaporator frosting.

The path 618 conducts the cooled but still liquefied refrigerant to an electronically controlled expansion valve 620 that is controlled by a 0-to-10 volt signal generated by the processor 1900. The liquid refrigerant flows through the expansion valve 620 into the low pressure, cool side of the refrigerant circuit, where the liquid begins to vaporize and absorb heat from its surroundings. This boiling liquid passes first through the PAO heat exchanger 602, where it cools the liquid PAO fluid flowing into a line 622 and out a line 624 which lines lead to the PAO fluid circuit (shown at 700 in FIG. 8). The boiling refrigerant flows onward over the path 626 to the plate fin evaporator array 504 essentially identical to the evaporator array 514 shown in FIG. 9, where the refrigerant cools the air that is sucked into the module 400 at 501 (FIG. 5) from the outside air, through the air filter 502 and the plate fin evaporator array 504 and into the blower 508. The gaseous refrigerant leaves the plate fin evaporator array 504 and flows along the path 628 back through the brazed plate heat exchanger 614 and over the path 630 back to the compressor 601 where it is once again compressed and fed into the pair of condenser coils 406 to be compressed, thus completing the passage of refrigerant through this vapor compression cycle.

Combined temperature and pressure transducers monitor the condition of the refrigerant throughout this circuit. An RTD (resistor temperature device) temperature and pressure transducer 607 monitors the temperature and pressure of the liquid refrigerant as it leaves the condenser coils 406 and enters the brazed plate heat exchanger 614. A second RTD temperature and pressure transducer 616 monitors the temperature and pressure of the liquid refrigerant as it leaves the brazed plate heat exchanger 614 over the path 618 and flows through the expansion valve 620. Another temperature and pressure transducer 634 monitors the temperature and pressure of the gaseous, cooled refrigerant flowing out of the plate fin evaporator array 504. A pair of temperature and pressure transducers 609 and 611 monitors the temperature and pressure of the gaseous refrigerant entering the compressor 601 and also leaving the compressor 601. The refrigerant temperature and pressure readings generated by all of these transducers 607, 616, 634, 609, and 611 and also the pre-cool condenser air output temperature measured by the RTD air temperature transducer 540 are fed into the air conditioning and PAO processor 1900 (see FIG. 19) where these temperatures and pressures may be stored in the data log 1319 (FIG. 13).

The refrigerant temperatures measured by the RTD temperature transducers 609, 616 and 634 and the air temperature measured by the pre-cool air conditioner output RTD temperature transducer 540 are also used for air conditioner control purposes, as is illustrated in FIG. 15.

The pre-cool air conditioner output temperature measured by the RTD temperature transducer 540 is compared to a setpoint temperature, typically 10 degrees Celsius or thereabouts, by means of a controller 1506 which is implemented as a digital process control algorithm within the air conditioner and PAO processor 1900. As the desired output temperature is adjusted by the user, this setpoint temperature can be altered. This controller 1506 is given both proportional and integral outputs which are summed and used (as a 0-to-10 volt signal) to control an electronic exhaust gas bypass valve 638 (EGBV—FIGS. 6 and 15) which, to the degree it is open, permits compressed, hot gas to bypass the condenser coils 406 and the expansion valve 620 and to flow directly from the compressor 601 into the evaporator array 501, thereby raising the temperature and boiling excess liquid refrigerant within the evaporator array 504. The processor 1900 continuously adjusts this EGB valve 638 to maintain the air temperature at the pre-cool air conditioner's plate fin evaporator array 504 outlet at or just above freezing so that the evaporator array 504 is not permitted to ice up.

The refrigerant temperature (measured by the RTD transducer 616) at the outlet of the electronic expansion valve (EEV) 608, which is the inlet into the PAO heat exchanger 602 and plate fin evaporator array 504, is fed into another controller 1502 (FIG. 15), which is also implemented as a digital process control algorithm within the air conditioner and PAO processor 1900. This controller 1502 is also given both proportional and integral outputs which are summed and used (as a 0-to-10 volt signal) to control an electronic evaporator array pressure regulator valve EPR 632 (FIGS. 6 and 15) which valve controls how much cooled, expanded, gaseous refrigerant is permitted to enter the compressor 601. In this manner, the temperature at the input to the evaporator array 504 and the PAO liquid heat exchanger 602 are controlled and maintained at a setpoint value Tsp, which value is fed into the controller 1502 (FIG. 15). This setpoint is typically kept at 1 degree Celsius. As the desired unit output temperature is adjusted by the user, this setpoint may be altered. The air conditioning and PAO processor 1900 maintains this setpoint value, as well as other similar temperature and pressure setpoint values, in a memory for setpoints 1317 (FIG. 13) where these values may sometimes be altered when different types and classes of airplanes are being serviced.

The refrigerant temperature (measured by the RTD transducer 616) at the outlet of the electronic expansion valve (EEV) 608, which is the inlet into the PAO heat exchanger 602 and plate fin evaporator array 504, is compared to the refrigerant temperature (transducer 634) at the outlet of the plate fin evaporator array 504 by another controller 1504, which is also implemented as a digital process control algorithm within the air conditioner and PAO processor 1900. This controller 1504 may initially be given both proportional and integral outputs which are summed and used (as a 0-to-10 volt signal) to control the electronic expansion valve EEV 608 (FIGS. 6 and 15) which valve controls to what extent the entire evaporator array 504 is thoroughly wetted and participating in the cooling process. Experiments have shown, however, that the controller 1504 may have to be programmed in a nonlinear manner, with the control parameters worked out empirically by experiment and varying from a simple proportional and integral controller to some degree. The EEV 608 is adjusted to maximize the effective cooling area of the evaporator array, as is indicated by a maximum temperature drop across the plate fin evaporator array 504. The air conditioning and PAO processor 1900 may maintain different control algorithms for the controller 1504 as well as the other controllers 1502 and 1506 in the memory of setpoints 1315 (FIG. 13) so that different control algorithms and strategies may be selected and implemented for different types and classes of airplanes which are being serviced.

FIG. 7 presents a schematic diagram of the post-cool air conditioner 522. With reference to FIG. 7, a compressor 702 compresses the refrigerant and sends it along a path 704 to one of the pair of condenser coils 410, where the refrigerant is cooled by air flowing through the air conditioning module 400 under the impetus of the condenser fan 414, as was described above, where the refrigerant cools and becomes liquefied. The air conditioning and PAO processor 1900 (FIG. 19) sends out a first on/off post-cool shutoff signal to a solenoid valve 703 and an on/off post-cool compressor on signal 1704 which can turn the post-cool compressor 702 on and off (see FIGS. 18 and 19) and which can shut down the post-cool air conditioner 522 by shutting off the compressor 702 and isolating the compressor 702 from refrigerant migration by closing the solenoid valve 703. The shutdown algorithm will then close all the refrigeration valves 720, 738, and 732 (FIG. 7) to further prevent refrigerant migration back to the compressor 702.

The cooled and liquefied refrigerant next flows past a charging valve 708, a filter dryer 706, and a sight glass 710 over a path 712 to a brazed plate heat exchanger 714 (FIGS. 4 and 7) that is mounted at the very bottom of the air conditioning module 400, as is shown at 714 in FIG. 4. The brazed plate heat exchanger 714 has a multi-purpose design: it serves as a liquid refrigerant accumulator that collects any excess liquid refrigerant and any excess oil that may be in the suction line between the compressor 702 and the evaporator array 514, preventing damage to the compressor 702 (which is designed to pump vapor). The brazed plate heat exchanger 714 also serves as a liquid suction line sub-cooler that sub cools the liquid refrigerant by allowing the expanded gasses flowing along the path 728 and 730 and entering the compressor 702 to absorb heat from the liquid refrigerant in the line 712 and 718 and in the brazed plate heat exchanger 714. The liquid line side of the brazed plate heat exchanger 714 acts as a refrigerant receiver, accumulating excess refrigerant charge on the condenser side of the system. The brazed plate heat exchanger 714 increases the capacity and efficiency of the cooling system at high load conditions. Finally, the brazed plate heat exchanger is used to control the suction line superheat, allowing the evaporators to be fully flooded. Flooding the evaporators allows high cooling capacity from the evaporators as well as increasing the evaporator capacity while maintaining higher refrigerant temperature which helps avoid evaporator frosting.

The path 718 conducts the cooled but still liquefied refrigerant to an electronically controlled expansion valve 720 that is controlled by a 0-to-10 volt signal generated by the processor 1900. The liquid refrigerant flows through the expansion valve 720 into the low pressure, cool side of the refrigerant circuit, where the liquid begins to vaporize and absorb heat from its surroundings. This boiling liquid flows to the plate fin evaporator array 514, shown in FIGS. 9 and 10, where the refrigerant cools the air that is blown out through the air duct 26 to the airplane (not shown). The gaseous refrigerant leaves the plate fin evaporator array 514 and flows along the path 728 back through the brazed plate heat exchanger 714 and over the path 730 back to the compressor 702 where it is once again compressed and fed into the pair of condensers 410 to be cooled and liquefied, thus completing the passage all the way through this circular refrigerant circuit.

Combined temperature and pressure transducers monitor the condition of the refrigerant throughout this circuit. An RTD temperature and pressure transducer 707 monitors the temperature and pressure of the liquid refrigerant as it leaves the pair of condensers 410 and enters the brazed plate heat exchanger 714. A second RTD temperature and pressure transducer 716 monitors the temperature and pressure of the liquid refrigerant as it leaves the brazed plate heat exchanger 714 over the path 718 and flows through the electronic expansion valve 720. Another temperature and pressure transducer 734 monitors the temperature and pressure of the gaseous, cooled refrigerant flowing out of the plate fin evaporator array 514. A pair of temperature and pressure transducers 709 and 711 monitors the temperature and pressure of the gaseous refrigerant entering the compressor 702 and also leaving the compressor 702. The refrigerant temperature and pressure readings generated by all of these transducers 707, 716, 734, 709, and 711 and also the post-cool condenser air output temperature measured by the RTD air temperature transducer 544 are fed into the air conditioning and PAO processor 1900 (see FIG. 19) where these temperatures and pressures may be stored in the data log 1319 (FIG. 13).

The refrigerant temperatures measured by the RTD temperature transducers 709, 716 and 734 and the air temperature measured by the pre-cool air conditioner RTD output temperature transducer 544 are also used for air conditioner control purposes, as is illustrated in FIG. 15.

The pre-cool air conditioner output temperature measured by the RTD temperature transducer 544 is compared to a setpoint temperature, typically 10 degrees Celsius or thereabouts, by means of a controller 1512 which is implemented as a digital process control algorithm within the air conditioner and PAO processor 1900. As the desired output temperature is adjusted by the user, this setpoint temperature can be altered. This controller 1512 is given both proportional and integral outputs which are summed and used (as a 0-to-10 volt signal) to control an electronic exhaust gas bypass valve 738 (EGBV—FIGS. 7 and 15) which, to the degree it is open, permits compressed, hot gas to bypass the pair of condenser coils 410 and the expansion valve 720 and to flow directly from the compressor 702 into the evaporator array 514, thereby raising the temperature and boiling excess refrigerant liquid within the evaporator array 514. The processor 1900 continuously adjusts this EGB valve 738 to maintain the air temperature at the pre-cool air conditioner's plate fin evaporator array 514 outlet at or just above freezing so that the evaporator array 514 is not permitted to ice up.

The refrigerant temperature (measured by RTD transducer 716) at the outlet of the electronic expansion valve (EEV) 708, which is the inlet into the plate fin evaporator array 514, is fed into another controller 1508 (FIG. 15), which is also implemented as a digital process control algorithm within the air conditioner and PAO processor 1900. This controller 1508 is also given both proportional and integral outputs which are summed and used (as a 0-to-10 volt signal) to control an electronic evaporator array pressure regulator valve EPR 732 (FIGS. 7 and 15) which valve controls how much cooled, expanded, gaseous refrigerant is permitted to enter the compressor 702. In this manner, the temperature at the input to the evaporator array 514 is controlled and maintained at a setpoint value Tsp, which value is fed into the controller 1508 (FIG. 15). This setpoint is typically kept at 1 degree Celsius. As the desired unit output temperature is adjusted by the user, the setpoint may be altered. The air conditioning and PAO processor 1900 maintains this setpoint value, as well as other similar temperature and pressure setpoint values, in a memory for setpoints 1317 (FIG. 13) where these values may sometimes be altered when different types and classes of airplanes are being serviced.

The refrigerant temperature (measured by RTD transducer 716) at the outlet of the electronic expansion valve (EEV) 708, which is the inlet into the plate fin evaporator array 514, is compared to the refrigerant temperature (transducer 734) at the outlet of the plate fin evaporator array 514 by another controller 1510, which is also implemented as a digital process control algorithm within the air conditioner and PAO processor 1900. This controller 1510 may initially be given both proportional and integral outputs which are summed and used (as a 0-to-10 volt signal) to control the electronic expansion valve EEV 708 (FIGS. 7 and 15) which valve controls to what extent the entire evaporator array 514 is thoroughly wetted and participating in the cooling process. Experiments have shown, however, that the controller 1510 may have to be programmed in a nonlinear manner, with the control parameters worked out empirically by experiment and varying from a simple proportional and integral controller to some degree. The EEV 708 is adjusted to maximize the effective cooling area of the evaporator array, as is indicated by a maximum temperature drop across the plate fin evaporator array 514. The air conditioning and PAO processor 1900 may maintain different control algorithms for the controller 1510 as well as the other controllers 1512 and 1508 in the memory of setpoints 1315 (FIG. 13) so that different control algorithms and strategies may be selected and implemented for different types and classes of airplanes which are being serviced.

The compressors 601 and 702 are part number ZR300-KCE-TWD-250 of Copeland, Sidney, Ohio. The suction line subcoolers or brazed plate heat exchangers 614 and 714 are part number AA6259 of SWEP International, Landskrona, Sweden. Pressure transducers are part number MX5018 provided by Gems Sensors & Controls, Plainville, Conn. The pairs of 60" by 34" preassembled microchannel condenser coils 406 and 410 are part number 26944 D13 custom assembled by Trilectron Industries, Palmetto, Fla.

Clearly, the proper operation of the air conditioner components just described is dependent upon the proper operation of many air and refrigerant temperature and pressure measurements. If any of the measurement instruments fail, the air conditioners 520 and 522, under the control of the air conditioning processor 1900, tries to continue operating, with warning messages, substituting for actual temperature and pressure measurements historical temperature and pressure measurements recorded on earlier days when the ambient weather conditions and the type or class of airplane were the same. In this manner, the air conditioning system continues to operate even when some of its sensors and controllers are inoperative.

A major advantage of the air conditioning system just described is its ability to enter a fully operative state, providing full pressure of air cooled to the proper temperature, within 20 seconds or so of when it is first started up, rather than several minutes later as in conventional air conditioning airplane ground support equipment.

As explained above, the PAO liquid coolant system 700 derives its cooling from the heat exchanger 602 which is part of the pre-cool air conditioner 520. The PAO system 700 does not derive its cooling from the post-cool air conditioner 522. Accordingly, when the PAO system is in operation, it reduces the cooling capacity of the pre-cool air conditioner 520. The post-cool air conditioner 522 may be adjusted upwards in the amount of cooling which it provides to the air flowing through the air duct 26 to the airplane so that the turning on and off of the PAO system 700 does not necessarily alter the temperature and pressure of the cooled and dehumidified air provided to the airplane by the air duct 26.

The PAO cooling system 700 is illustrated schematically in FIG. 8. Most of the elements of the PAO cooling system are positioned within the air conditioning module 400 near the top of that module, adjacent to the pair of PAO liquid coolant conduits 28 shown in FIGS. 1 and 2 that convey the PAO liquid to and from the airplane to shorten the length of the PAO liquid coolant conduits 28 as much as possible. A PAO liquid reservoir 803 is positioned lower down within the module 400 to serve as a reservoir for reserve amounts of the PAO liquid coolant.

With reference to FIG. 8, a PAO fluid pump 805 pumps PAO fluid through a first check valve 807 and through a second check valve 809 to the heat exchanger 602, which is part of the pre-cool air conditioner 520, as was explained above. The cooled PAO fluid then flows onwards over a path 811 through filters 813 and over a path 817 to a supply solenoid valve 819 that is turned on and off by the processor 1900 (FIG. 19). When the valve 819 is open, the PAO fluid flows over a path 820 out of the air conditioning module 400 and over a conduit 822 into an airplane 823 where it flows through and cools electronics and avionics components 825.

The PAO fluid then flows over a second conduit 824 back from the airplane 823 to the air conditioning module 400 and over a path 826 that leads to the PAO liquid reservoir 803 where it collects, waiting to be drawn back out by the pump 828 and sent back to the heat exchanger 602 again. That completes the PAO liquid coolant circuit.

The PAO liquid coolant collects in the liquid reservoir 803. A liquid level sensor 824 signals to the air conditioning and PAO processor 1900 (FIG. 19) when the liquid level is too low. When the PAO system is cabled up to an airplane, there is typically air in the conduits 822 and 824 and possibly in the electronics and avionics as well. When the PAO system is first turned on, the solenoid valve 819 is opened and then the PAO pressure is slowly raised up to the proper operating pressure. Any air present in the system collects above the liquid in the reservoir 803, and a vacuum pump 833, actuated by the air conditioning and PAO processor 1900 (FIG. 19), pumps this air out of the liquid reservoir 803. This prevents overheating of the electronics and avionics 825 caused by air displacing the PAO liquid coolant in the circulating system.

A 3-way proportional flow regulator valve 828 (FIGS. 8 and 15) controls and continuously adjusts a liquid coolant bypass path 829-830 that bypasses the heat exchanger 602 with some of the PAO liquid to reduce the cooling effect. The regulator 828 receives temperature signals directly from a temperature and pressure sensor transducer 832. Alternatively, the processor 1900 can implement a digital controller which can compare the temperature measured by the transducer 832 to an adjustable setpoint temperature and then adjusts the regulator valve 828 accordingly.

A bypass path 834 is controlled by an electronically controlled proportional flow restriction valve 821 having a pressure setpoint that can be set and varied by the air conditioning and PAO processor 1900. As is illustrated in FIG. 15, a controller 1516 compares the PAO system output pressure, as measured by the temperature and pressure sensing transducer 832, to a setpoint pressure Psp (stored in the memory for setpoints 1317 (FIG. 13) and then amplifies the pressure difference using proportional and integral control functions to generate control signals which are summed and then fed as a control signal to the electronically controlled proportional flow restriction valve 821. The controller 1516 can be implemented as a control algorithm within the air conditioning and PAO processor 1900. The pressure setpoint Psp may be varied in accordance with the specific needs of different types and classes of airplanes being serviced in response to airplane selection using the main menu shown in FIG. 21. It is also possible to have the restriction valve 821 respond directly to pressure indicating signals from the transducer 832 without the use of the processor 1900 and the controller 1516, and this is the arrangement actually shown in FIG. 8 (for this reason, FIG. 19 does not presently show an output signal from the processor 1900 leading to the valve 821).

To protect the PAO system 700 from transients, a bypass valve 835 can be actuated by excessive pressure sensed by the transducer 832 and opened to bypass the heat exchanger 602, pump 805, and reservoir 803. The controller 1516, implemented within the processor 1900, opens the bypass valve 835.

A PAO hydraulic manifold assembly, part number AGA15700-0-C, which includes the components 819, 821, and 835, can be obtained from the Rexroth Bosch Group. The PAO pump 833, Model 4600-20, comes from McNally Industries, Grantsburg, Wis. The PAO heat exchanger 602 is part number AA 6283 of Swep International, Landskrona, Sweden. The PAO pump pressure relief system is part number a971207 zc 04a2 is supplied by Sun Hydraulics, Sarasota, Fla.

To increase the efficiency and also to decrease the size of the evaporator arrays 504 and 514, in one embodiment these evaporator arrays are each constructed from four automotive plate fin evaporator arrays 802, 804, 806, and 808 (FIGS. 9 and 10) assembled into a roughly square frame 810 and held in place by a cover plate 812. The assembled frame 810 and plate fin evaporator arrays 802-808 shown in FIG. 8 is used to construct each of the two evaporator arrays 504 and 514. The evaporator array 514 is shown in FIGS. 9 and 10 attached to an incoming expansion chamber or air funnel 513 (FIG. 9) which accepts air flowing out of the blower 508 and spreads this air out in a uniform manner over the surface of the four plate fin evaporator arrays 802-808 to maximize the cooling efficiency of this unit. Air flows out of the evaporator array 514 into a second funnel 516 which ducts the air to an outgoing cooled air port 518 to which is attached the air duct 26 (FIGS. 1, 2, 4, and 5) that conveys the cooled air to the airplane. The evaporator array 504 (not shown in FIGS. 8 and 9—shown in FIGS. 4 and 5) receives outside air 501 that flows through the air filter 502 directly into the evaporator array 504. Air flows out of the evaporator array 504 through a funnel 505 (FIG. 4) directly into the blower 508. The plate and fin design of the evaporator arrays 504 and 514 allows them to be inexpensive, compact, and highly efficient.

To decrease the size and increase the efficiency of the condenser coils 406 and 410, each condenser is constructed from a pair of overlaid and interconnected microchannel condenser coils. With reference to FIG. 4, these pairs of condenser coils 406 and 410 are long and wide enough to be mounted on the panels or door assemblies 404 and 408. The door 404 may be swung open to give convenient access to the other mechanical air conditioning components within the module 400, as is shown. The pairs of condenser coils 406 and 410 are quite thin, so they do not take up much room within the air conditioning module 400, unlike prior tube and fin arrangements which were much more bulky.

With reference to FIGS. 11 and 12, the microchannel condenser coils (used in pairs to construct the condenser coils 406 and 408) are each constructed as a pair of parallel, spaced-apart refrigerant pipes 1002 and 1004 having narrowed or tapered end sections 1006 and 1008 for convenient attachment to copper or flexible tubing. Hollow, rectangular ducts 1010 are mounted between and perpendicular to the pipes 1002 and 1004, with the ends of the ducts 1010 passing through slots cut partway through the sides of the pipes 1002 and 1004, as is best shown in FIG. 12. The rectangular ducts 1010 are further partitioned internally by partitions 1012 into very small, rectangular channels that provide paths through which the refrigerant may pass between the two pipes 1002 and 1004 flowing through the ducts 1010. The spaces between the rectangular ducts 1010 are then filled in with folded, thin aluminum fins folded accordion style to maximize heat transfer between the air flowing through the microchannel condenser coil and the refrigerant flowing from the pipe 1002 to the pipe 1004. These aluminum fins, as well as the arrangement of pairs of condenser coils, force the air to travel a zigzag course, and this further adds to the efficiency of the design.

Further details concerning the general design of such microchannel condenser coils may be found in U.S. Pat. No. 6,988,538 which issued to Justin P. Merkys, et al. on Jan. 24, 2006.

Referring now to FIG. 13, all of the modules 14, 20, 22, 400, and 1308 are shown to be networked together by a network 1312, which in one embodiment is realized using a CAN bus, developed by CIA (CAN In Automation), Erlangen, Germany. Clearly, other bus protocols can also be used, including Ethernet and TCP/IP to network these components together. The CAN bus is one designed particularly for use in a hostile, automotive, outdoors environment. The control module 22 communicates with the can bus network 1312 using a cart network bus driver 1310, and all the other module-based processors do likewise (not shown in FIG. 13).

The control module 22 is shown to have a display screen 24 that has an array of four pushbuttons 1302 to its left and a second array of four pushbuttons 1304 to its right, aligned with menu selections on displayed images (see menus and submenus, FIGS. 21-28). The menus are stored within a universal control and diagnostic processor 1306 which manages the display screen 24 and also manages some diagnostics tasks and the like. The processor 1306 inquires over the bus network 1312 as to which modules are present, and it tailors the displayed information accordingly. Menus and diagnostics are not displayed for any module that is not present and operating.

Figure 20:
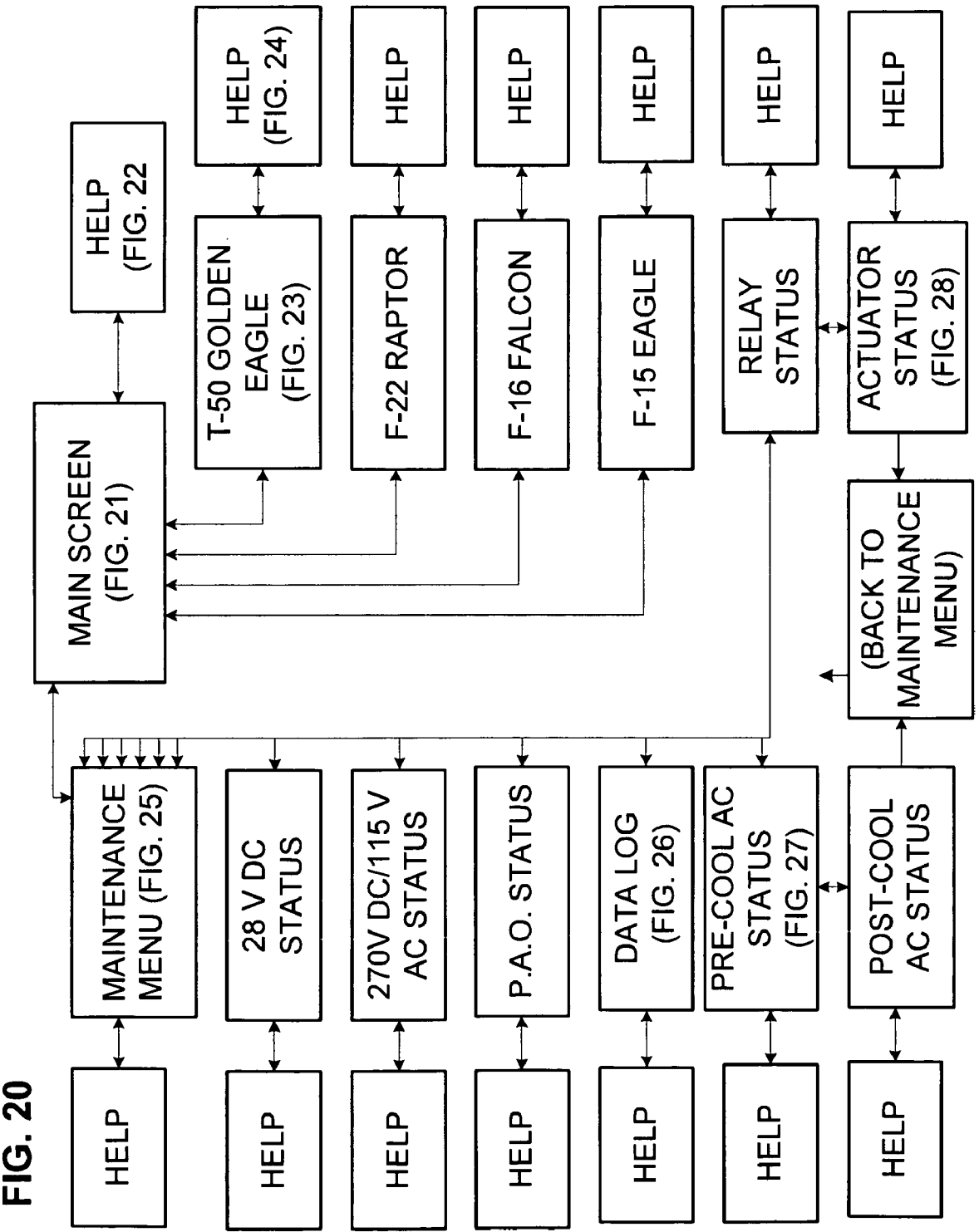
FIG. 20 presents a block diagram of all the menus and submenus that may be displayed on the face of the control module's display screen, together with the navigation paths between these menus and submenus.

A hierarchical arrangement of one possible set of menus and other displays is shown in FIG. 20. When the system is first turned on, a main screen or menu (shown in detail in FIG. 21) is displayed. This main menu permits the operator of the cart 10 to simply select which of several airplanes the ground support equipment cart is to service. If the operator depresses the pushbutton adjacent the "T-50 Golden Eagle" item, a secondary menu shown in FIG. 23 is displayed. When the operator depresses the pushbutton adjacent the "Start" item, the air conditioners, one of the power sources, and the PAO liquid cooling system are all started up. The processor 1306 conveys to the processors within other modules, and in particular the air conditioner and PAO processor 1900, the identity of the plane that is to be serviced (the T-50), and this allows, for example, the air conditioner and PAO processor to adjust the setpoints 1317 that control the operation of the two air conditioners and the PAO system in accordance with the specialized needs of the T-50 class of airplanes. FIG. 15 illustrates many of the temperature Tsp and pressure Psp setpoints whose settings may be adjusted in this manner to adapt the equipment on the cart 10 to the needs of particular types and classes of airplanes.

Figure 25:
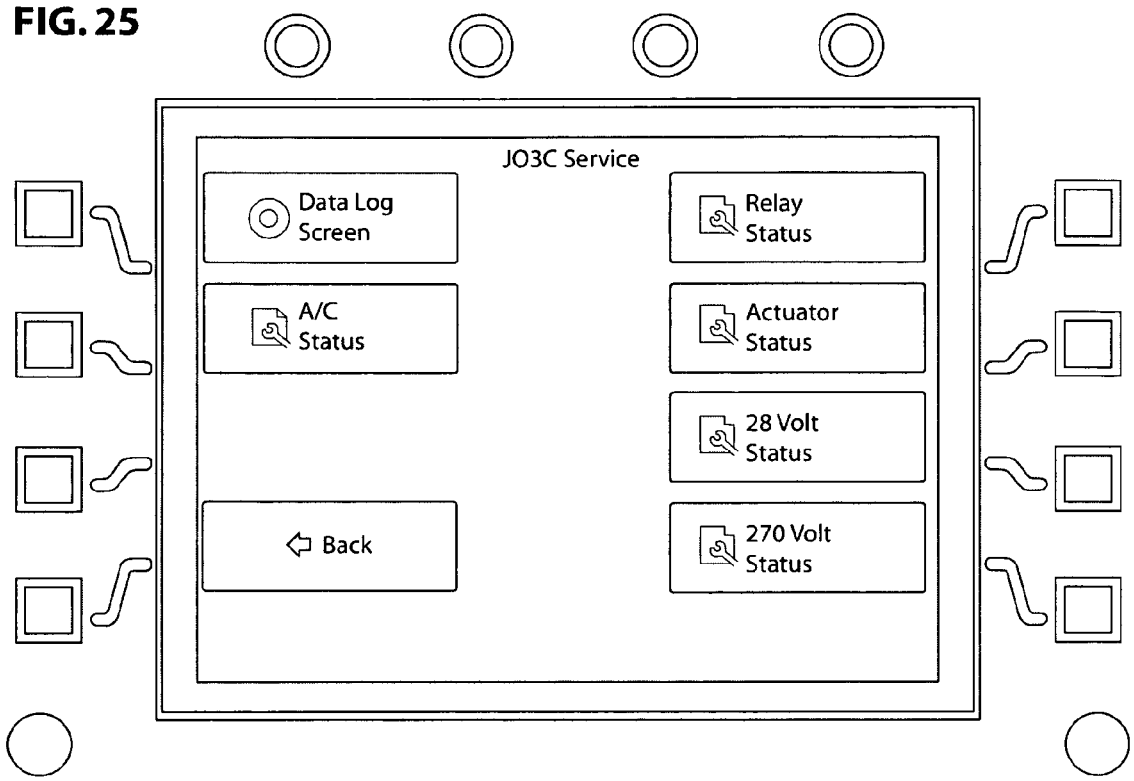
FIG. 25 presents a view of a maintenance menu that appears when the "Maintenance" item is selected on the main menu shown in FIG. 21.
Figure 26:
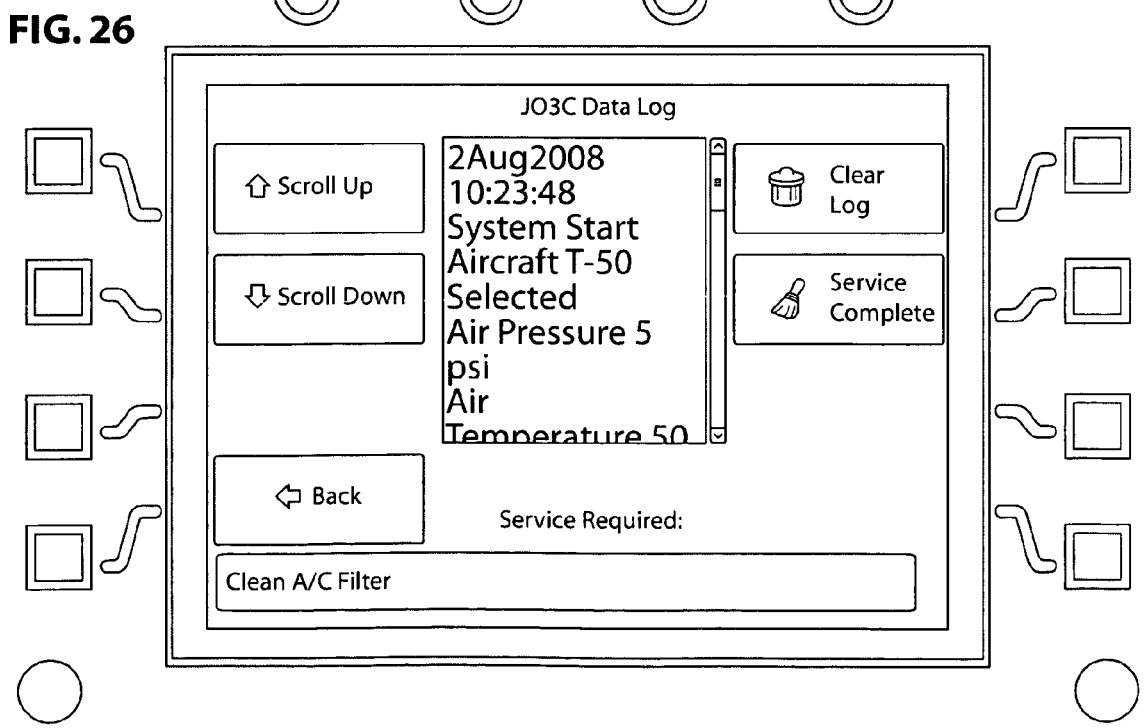
FIG. 26 presents a view of a scrollable data logging menu and viewing window that appears when the "Data Log Screen" item is selected on the maintenance menu shown in FIG. 25.
Figure 27:
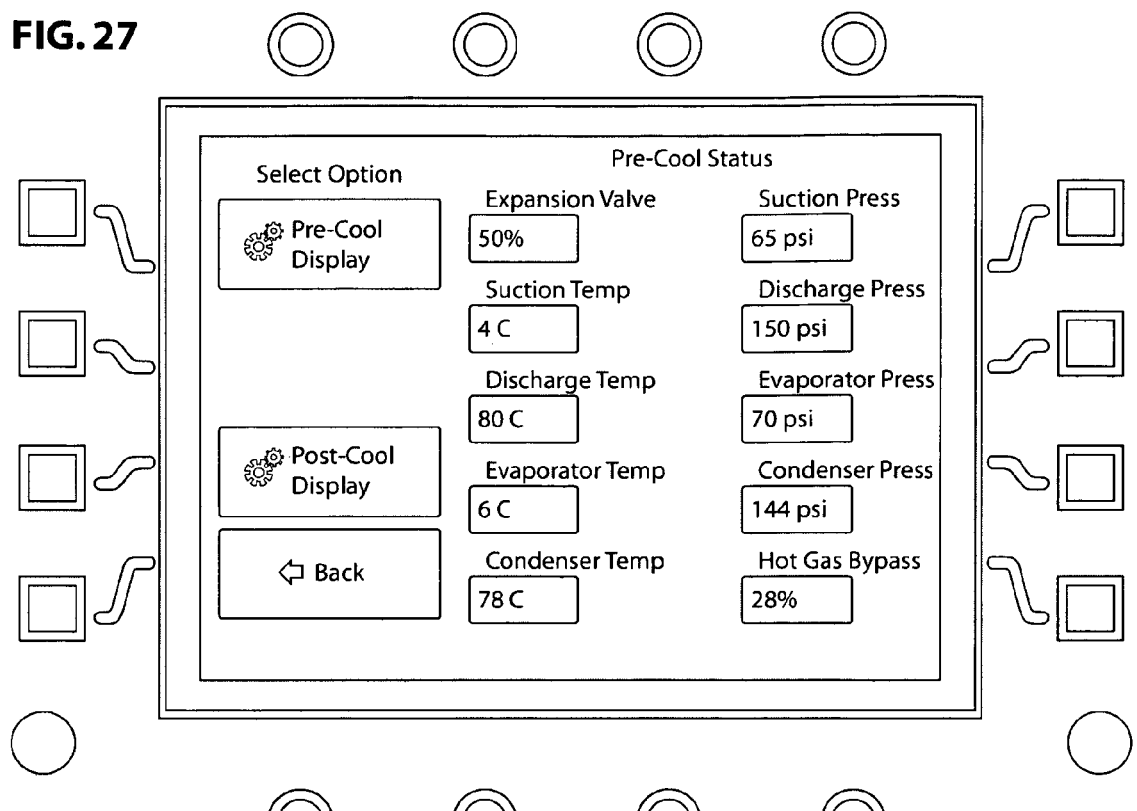
FIG. 27 illustrates a view of a pre-cool air conditioning unit's status values that appears when the "A/C Maintenance" item is selected on the maintenance menu shown in FIG. 25.
Figure 28:
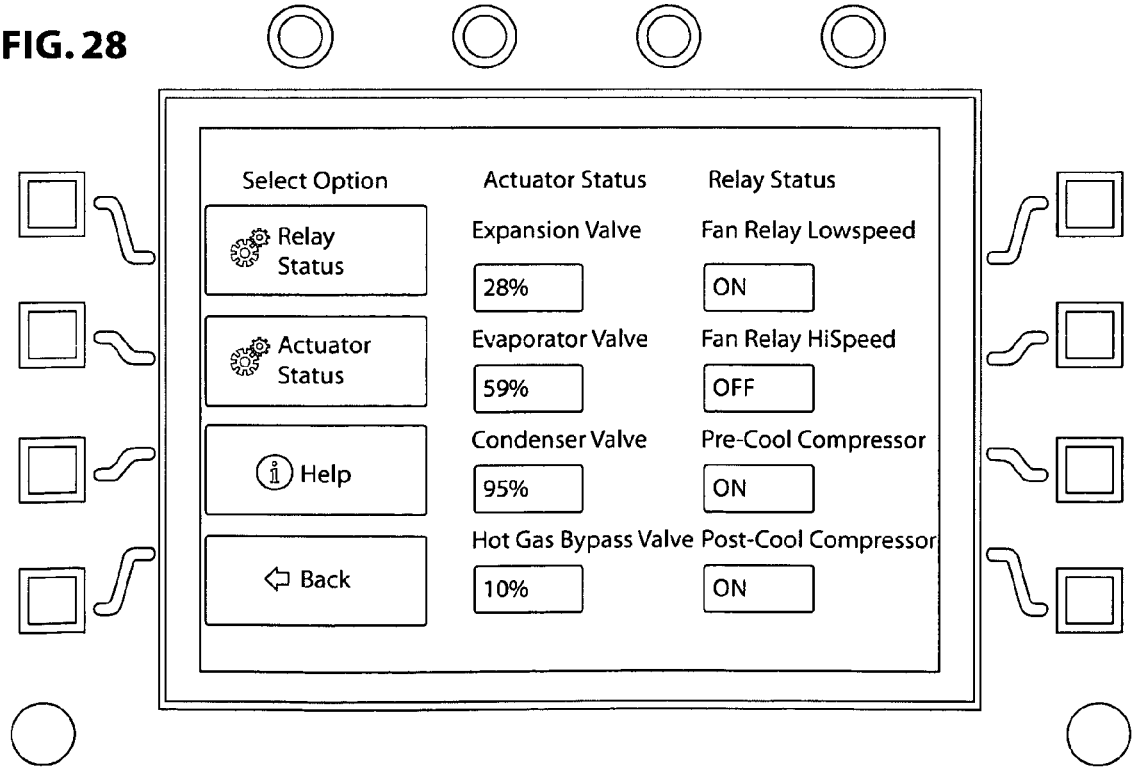
FIG. 28 illustrates a view of one of two actuator status and relay status screens that appear when the "Relay Status Screen" item is selected on the maintenance menu shown in FIG. 25—the values displayed correspond to the more important output control signals generated by the air conditioning and PAO processor shown in FIG. 19.

The operator may return to the main menu (FIG. 21) and depress the pushbutton adjacent "Maintenance," and then a maintenance menu is displayed (FIG. 25). From this maintenance menu, one may navigate to a Data Log display (FIG. 26) where one may scroll through a log of temperatures, pressures, and other data gathered over time. This data log information 1319 (FIG. 13) is also available for further processing by the universal control and diagnostics processor 1306 which can generate reports predicting such things as when certain components will require service or are likely to fail. For example, a gradual increase in the differential pressure across the air filter 502 measured by the differential pressure sensor 528 would enable one to predict when the filter 502 will have to be cleaned or replaced. Other similar maintenance and repair prediction reports can be generated in this manner by the diagnostic processor 1306. The data log 1319 is maintained by processors (such as the processor 1900) within each module, so that this information stays with each module if the modules are moved about and separated.

Other more focused maintenance reports may be displayed. For example a pre-cool air conditioner status report (FIG. 27) indicates the current status of the air conditioner 520, indicating such useful things as how much refrigerant is currently bypassing the pair of condenser coils 406 by flowing through the bypass valve 638 to reduce the temperature of the evaporator array 504, as was explained above. The current settings of the expansion valve 620 and of other valves and the speed of the condenser fan 414 are also indicated, along with the on/off state of the two compressors 601 and 702.

Figure 22:
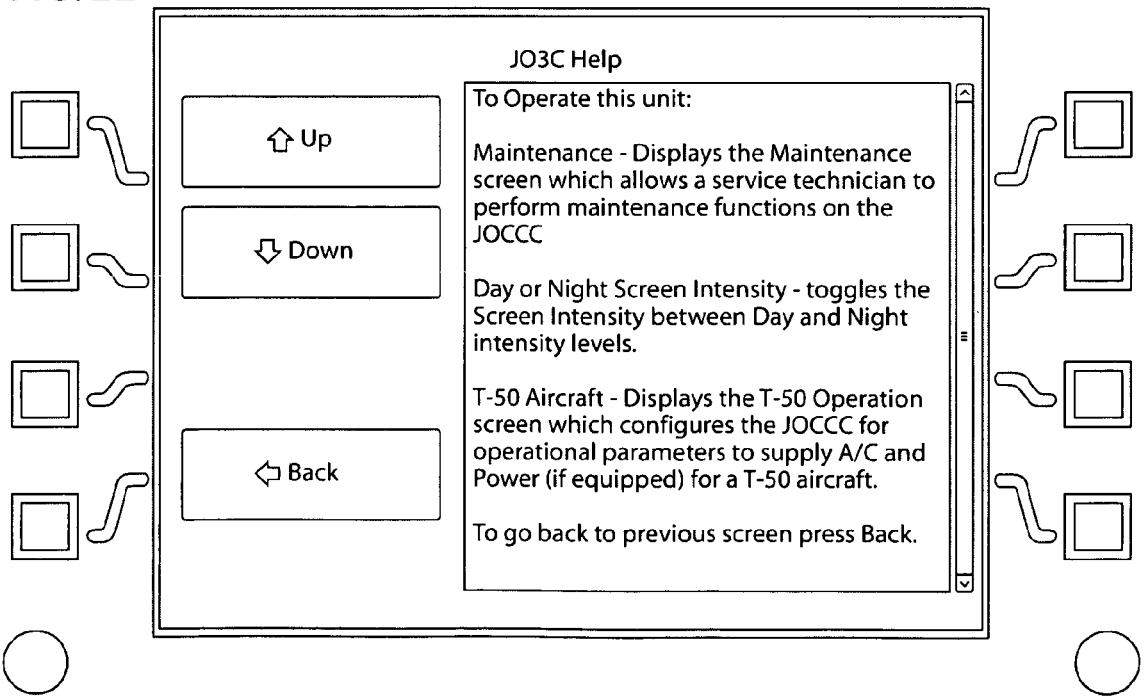
FIG. 22 presents a view of a help menu that appears when the "Help" item is selected on the main menu shown in FIG. 21.
Figure 24:
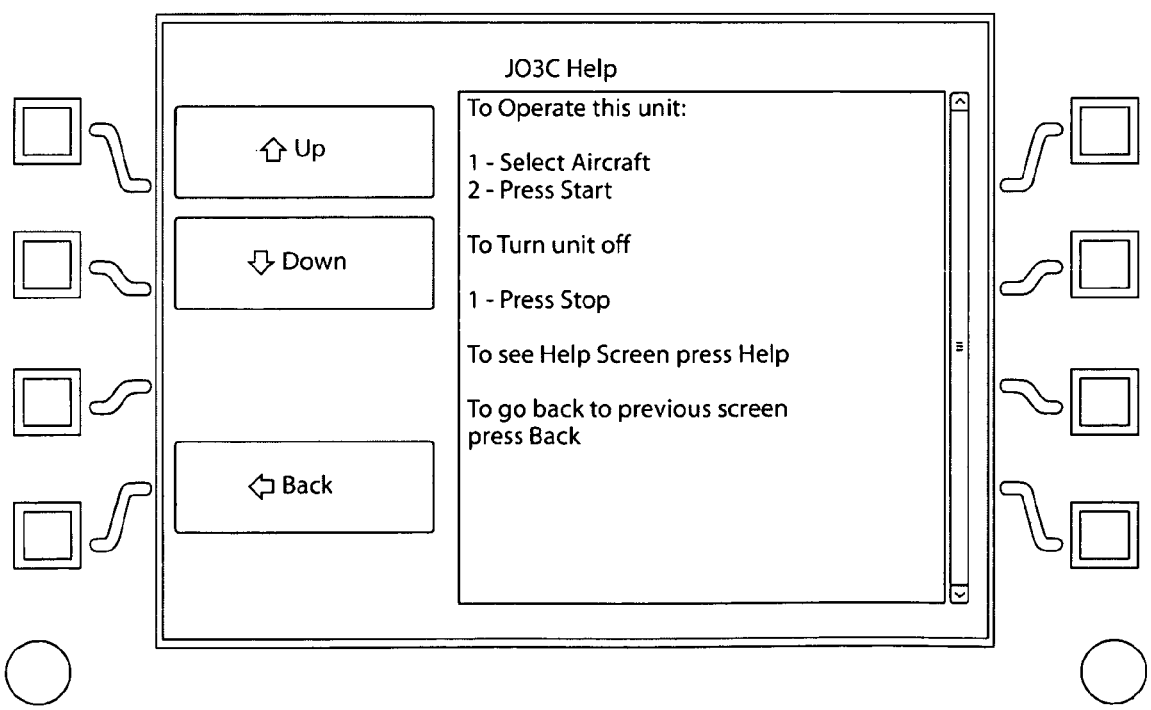
FIG. 24 presents a view of a help menu that appears when the "Help" item is selected on the "T-50 Golden Eagle" menu shown in FIG. 23.

Help menus are also provided, as is shown in the illustrative menus shown in FIGS. 22 and 24.

Figure 29:
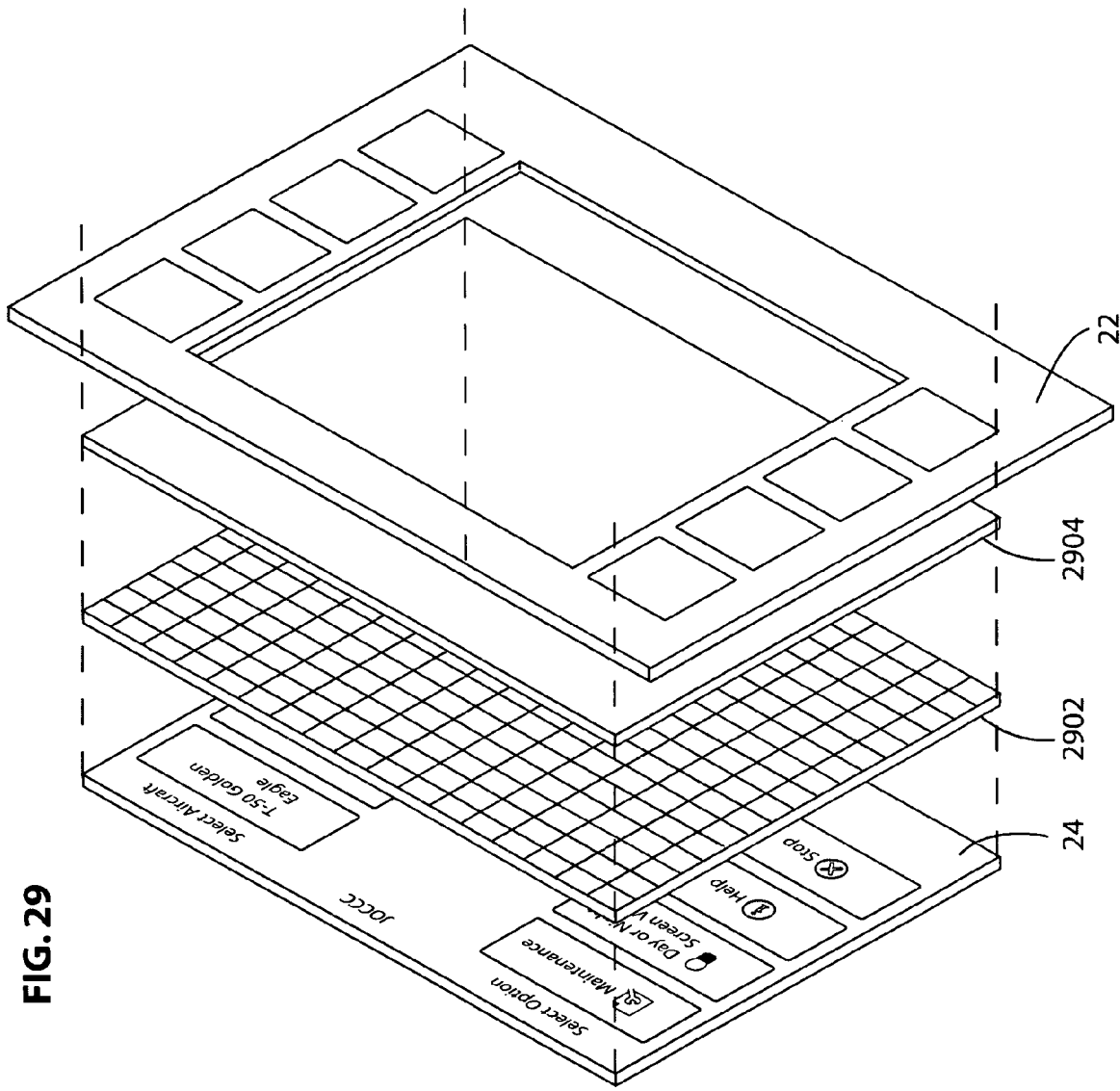
FIG. 29 presents an exploded isometric view of the control module's display screen, illustrating that the screen is covered by metal screening that serves as a radio frequency wave blocking screen.

FIG. 29 presents some mechanical details of the display screen 24. The display screen 24 is a black-and-white, electroluminescent display that is fully operable over extreme ranges of temperature. The display screen 24 is sandwiched together with a metal screen 2902 and with a protective plastic cover plate 2904 all of which are mounted to the side of the control module 22 facing an operator standing before the cart 10. The screen 2902 provides radio frequency shielding to the display, preventing signals from leaking either into the control module 22 or out of the control module 22. This rugged, simple arrangement of an all-weather display and eight rugged pushbuttons 1302 and 1304 provides an all-weather display that combines many displays and controls which, in prior designs for ground support equipment carts, were scattered all over the cart, with separate gauges and controls for each appliance, and with no uniformity of control.

Figure 14:
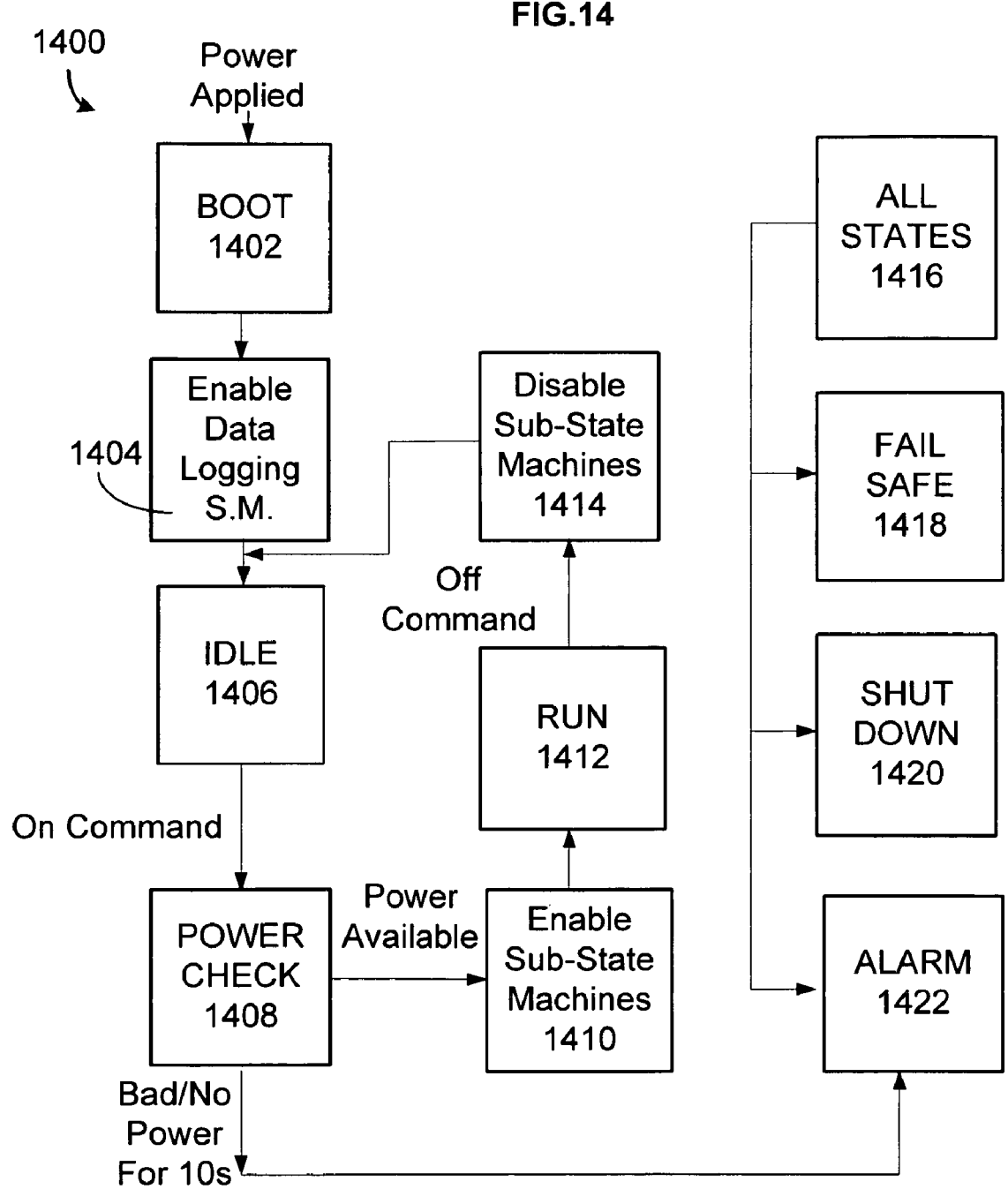
FIG. 14 is a combined flow diagram and state diagram illustrating the normal start-up and run procedures of the overall system and also illustrating the warning, alarm, and shut down states.

Referring now to FIG. 14, the state machine of a master process 1400 for the air conditioner and PAO processor 1900 is shown. When power is applied to the module 400, the processor 1900 initiates a boot sequence 1402 that prepares the processor 1900 for operation. The boot sequence 1402 enables the processor 1900 to determine whether it is configured as a "stand-alone" or "cart-mounted" module. If the module 400 is cart mounted, it waits (at step 1406) for the start command to come in from the CAN data bus after actuation of a START menu command on an airplane-specific menu such as that shown in FIG. 23. Otherwise, the processor 1900 seeks discrete signals from its own more primitive user interface (possibly a portable computer plugged into the module 400 using an Ethernet, CAN, or USB portal.

After the boot sequence 1402, the processor 1900 enables a data logging sub-machine 1404. The data logging sub-machine 1404 receives present sensor signals from the module 400 and records them in the data log 1319. This data log is used by the processors 1900 and 1306 for predictive failure and for enhanced diagnostic functioning, as has been explained.

After the processor 1900 enables the data logging sub-machine 1404, it enters an idle state at 1406. In the idle state 1406, the processor 1900 waits for an "On" command to arrive, as from the "Start" command on the airplane-specific menu shown in FIG. 23. This "On" command may come from the CAR data bus or the user interface of the module 400. After the processor 1900 receives the "On" command, it exits the idle state 1406 and enters the check power state at 1408.

In the check power state 1408, the processor 1900 performs a self test. Stored default parameters or menu-selected operating parameters are given to the processor 1900 at power up. These operating parameters set the setpoint 1317 temperatures and pressures that the processor 1900 desires to achieve (see the values Tsp and Psp shown in FIG. 15). These operating parameters are adjusted to those appropriate to the output temperatures and pressures (and electrical power) required by any given airplane that may need to be connected to the air conditioning and PAO module 400. After the check power state is done, the processor 1900 stages the compressors 601 and 702 and the blower 508 on to assure that the air conditioner output temperature (measured by the transducer 544) is not permitted to exceed an undesired level. Additionally, the processor 1900 stages all of the remaining big loads on to prevent undue transient loading of the electrical source of power. Thus, the PAO system 700 is gradually brought up to pressure and down in temperature, and the vacuum pump 833 clears the PAO system of air before it comes fully on line.

While in the check power state 1408, the processor 1900 also auto-detects the input power type (using transducers 1708 to 1718 shown in FIG. 18) and varies the two air conditioners' 520 and 522 and the PAO system's 700 settings accordingly, degrading the maximum obtainable performance to reflect less power availability or the need to provide PAO cooling in addition to air cooling. For example, if the processor 1900 detects a lower input voltage than a desired input voltage on the transducers 1710, 1712, and 1716, the processor 1900 may adjust the setpoints 1317 to provide less cooling to the airplane to compensate for this. This automatic response to changing power conditions allows the user seamless use of the unit regardless of the city or country in which the unit is being operated.

If the processor 1900 senses no power or abnormal power for ten seconds, it disables any machines presently running, attempts to isolate the power fault, and then enters a system fault triggering alarm state 1422. Such a system fault is announced with an audible and visible alarm. So long as any power is available to it, the processors 1900 and 1306 continue operate, allowing isolation of the fault and continued use of the remainder of the modules. Capacitors that momentarily store charge provide brief continued running time for the processors 1900 and 1306 following a power failure. In an alternative arrangement, back-up batteries could be provided within each module to provide the module processors with continued power to operate and to perform diagnostics when power is not available for some reason.

If adequate power is available, the processor 1900 enters the enable sub-state machines state 1410 where it starts up various real-time background processes. From the state 1410, the processor 1900 proceeds to the run state 1412. In the run state 1412, the processor 1900 commences normal operation. Under normal operation, the processor 1900 achieves the desired output parameters (the given setpoint temperatures and pressures) as efficiently as possible by staging the condenser fan 414 to slow and fast settings and by adjusting the air conditioning and PAO parameters to produce the desired output. The selected parameters or setpoints are utilized as is shown in FIG. 15, where the controllers 1502, 1504, 1506, 1508, 1510, 1512, 1514, and 1516 are all implemented as process control digital algorithms executing as control chains instituted within the air conditioning and PAO processor 1900 such that each controller implements a control chain within the processor 1900 that becomes part of one of the feedback control loops shown in FIG. 15 within the two air conditioners 520 and 522 and the PAO system 700. Data log processing continues during this normal operation of the processor 1900.

Maintenance and diagnostics are also carried out by the two processors 1900 and 1306. The data log 1319 is collected for use in predictive failure and enhanced diagnostics. In the event of a minor component failure or imminent major component failure, the processor 1306 enters a fail safe state 1418. If, based on the data collected, there is a danger of continued operation, the processor 1306 announces a fatal system fault and enters the alarm state 1422 and immediately shuts down the unit at 1420. If the data log 1319 indicates that the unit is operating outside of its normal operating range, the processor 1306 announces a system fault and enters the alarm state 1422 but does not necessarily shut down the entire module 400. If the data log 1319 indicates that a problem may occur in the near future, the processor 1306 may simply announce a systems warning and enter the fail safe state 1418. The fail safe state 1418 does not sound an alarm, but it shows an indication on the display 22 as to the nature of the warning. The alarm 1422, fail safe 1418, and shutdown 1422 states may be entered from all other states 1416 in the master process 1300 of the processor 1900.

The controller continues normal operation in the run state 1412 until it receives an "Off" or "Stop" command, typically from one of the menus shown in FIGS. 21, 23, and 25. After receiving the "Off command," the processor 1900 enters the disable sub-state machines state 1414. While in this state 1414, the processor 1900 winds down the operation of all of the system components and stores any data log 1319. The processor 1900 then returns to the idle state 1406 and awaits another "On" or "Start" command.

Figure 16:
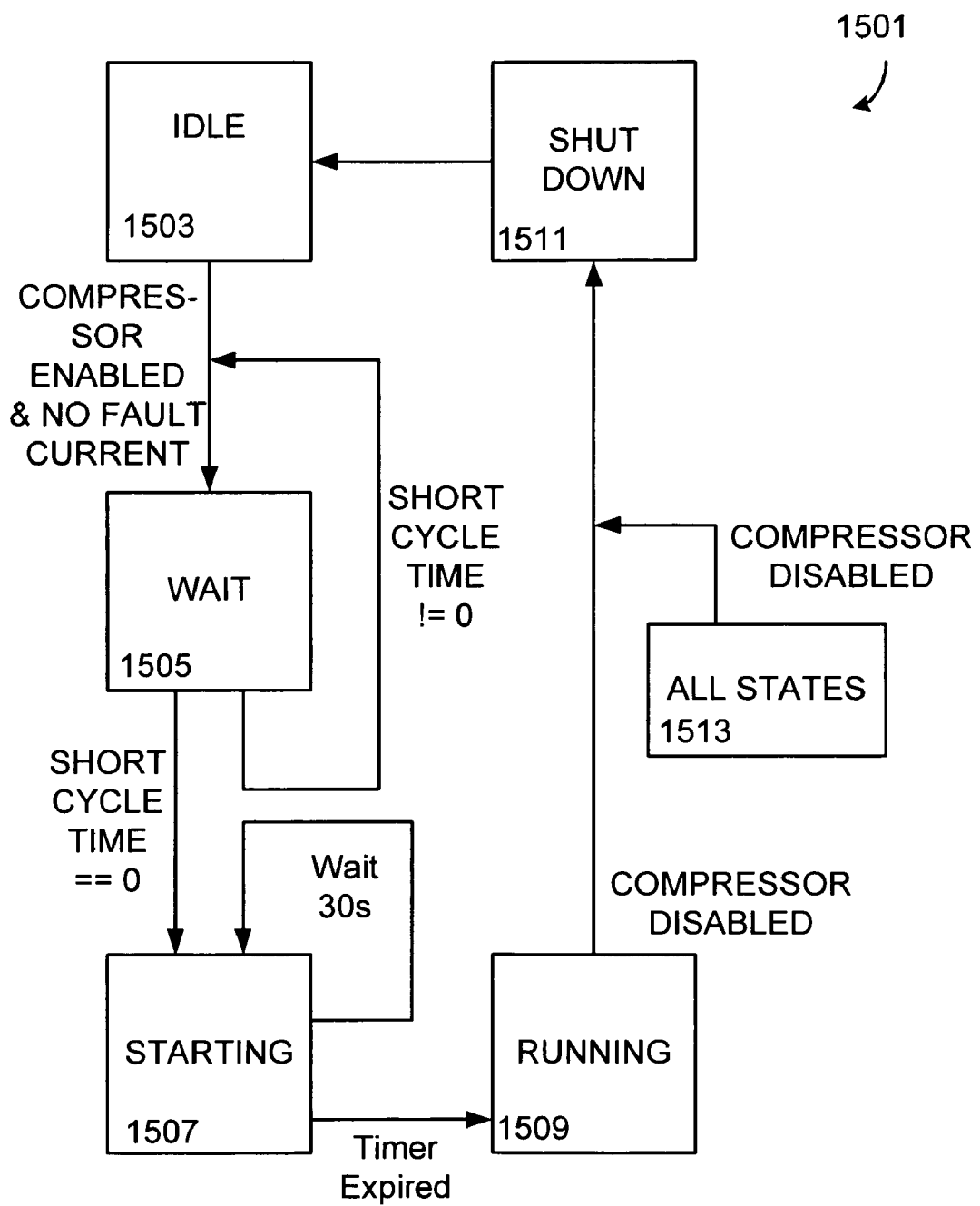
FIG. 16 is a state diagram illustrating the operation of the compressors within the two air conditioning units.

Referring now to FIG. 16, a processor 1900 implemented state machine 1501 for one of the compressors 601 or 702 is shown. The compressor state machine 1501 begins in an idle state 1503. Once the processor 1900 enables the compressor state machine 1501 and there is no current fault, the compressor state machine 1501 enters the wait state 1505. While in the wait state 1505, the compressor state machine 1501 runs a short cycle timer to produce a delay. Once the short cycle timer reaches zero, the compressor state machine 1501 moves from the wait state 1505 to the starting state 1507 and starts the compressor 601 or 702. While in the starting state 1507, the compressor state machine 1501 pauses for thirty seconds before advancing to the running state 1509.

The compressor state machine 1501 remains in the running state 1509, and the compressor 601 or 702 continues to operate, until the processor 1900 signals for the compressor to be disabled. Once the compressor disable command is received, the compressor state machine 1501 moves from the running state 1509 to the shut down state 1511. The compressor state machine 1501 may be signaled that the compressor has been disabled during any normal state 1513 in case of a system fault. Upon receipt of such a signal, the compressor state machine 1501 enters the shut down state 1511. Finally, from the shut down state 1511, the compressor state machine 1501 reenters the idle state 1503.

Referring now to FIG. 17, the blower 508 state machine 1600 is shown. The goal of the blower state machine 1600 is to achieve the desired flow rate of air and pressure to meet the operating parameters of any given airplane by controlling the variable speed impeller located within the duct of the two air conditioners. The blower 508 begins in an idle state at 1602. Once the processor 1900 enables the blower state machine 1600 and provides a pressure operating setpoint, the blower state machine enters a first of two troubleshooting states 1604. In this state, the impeller is set to low speed to troubleshoot any initial problems, such as a blockage or failure of the blower 508 to operate. The blower state machine 1600 then enters a second troubleshooting state 1606 in which checks of pressure and power to the blower 508 are run to see if an air duct 26 is connected between the cart 10 and an airplane or if, in some other respect, there is bad pressure. If no air duct 26 is connected, or if the air duct 26 is connected to the wrong type or class of airplane, or if sensors on the blower system otherwise sense bad pressure readings for ten seconds, the blower state machine 1600 will enter the alarm state 1622, giving forth an appropriate warning to the operator.

If an air duct 26 is connected and there is otherwise good pressure, the blower state machine 1600 will enter the adjust blower motor frequency state 1610. Here the motor 506 A.C. power frequency is set. The blower state machine 1600 then enters a state 1608 where it checks the pressure change across the blower 508. If no air duct 26 is connected, or if the air duct 26 is connected to the wrong type or class of airplane, or if sensors on the blower system otherwise sense bad pressure for ten seconds, once again the blower state machine 1600 enters the alarm state 1622, giving forth an appropriate warning to the operator. If an air duct 26 is connected and if there is good pressure, and if a type or class of airplane has been selected using the menu shown in FIG. 21, then the pressure change across the blower 508, measured by the differential pressure sensor 532 (FIG. 5), and the power consumed by the blower voltage-to-frequency converter 525, measured by multiplying the voltage 1720 by the current 1722 (FIG. 18), are compared to normal logged values found in the data log 1319 for the type or class of airplane that was selected on the menu shown in FIG. 21. If the pressure and power consumed do not correspond to that type of airplane, then the operator is given an alarm 1622 and the idle state 1602 is entered while the problem is checked out.

The blower state machine 1600 next checks the blower map 1612. The blower map contains data that helps guide and shape the control algorithm within the processor 1900 that sets the blower motor frequency. This data sets the operational limits of the blower system and also includes information assessing the health of the blower system.

If the status data of the blower 508 is contained within the blower map, the blower state machine 1600 enters a state 1614 where the blower 508 is permitted to run at a given frequency while the deviation of the cart 10 output pressure (as measured by the pressure transducer 526) is checked. If the deviation or error exceeds a threshold value (step 1650), then the blower frequency is once again adjusted at step 1615 to minimize the error.

If, at step 1612, data for the blower is not found within the blower map, the blower state machine 1600 enters the alarm state 1422 and shuts down the air conditioners.

FIG. 18 presents a partly block and partly schematic diagram of the signal and electrical power connections to the compressors 601 and 702, the two speed condenser fan 414, and the blower 508, its motor 506, and its voltage-to-frequency converter 525. The locations of voltage and current sensors are shown, all of which feed signals into the air conditioning and PAO processor 1900 shown in FIG. 19. Signals generated by the processor 1900 (shown in FIG. 19) and fed into the components 601, 702, 414, and 525 are also shown in FIG. 18 to complete the disclosure of all significant signals connecting the processor 1900 to the various air conditioning processes.

FIG. 19 presents the air conditioning and PAO processor 1900. FIG. 19 reveals and lists and categorizes all of the signals that flow from various types of sensors associated with the air conditioning processes and the PAO process into the processor 1900. It also reveals and lists and categorizes all of the control signals generated by the processor 1900 that flow back to and that control the components of the air conditioning processes and the PAO process. In FIG. 19, all the signals are identified by name and by the same reference number that is assigned to the transducer that is the source of an incoming signal or to the device that is the target of an outgoing signal. "PRE-C" is a signal relating to the pre-cool air conditioner 520 shown primarily in FIG. 6. "POST-C" is a signal relating to the post-cool air conditioner 522 shown in FIG. 7. "PAO" is a signal relating to the PAO liquid coolant processor shown in FIG. 8. Many of the signals shown in FIG. 19 which relate to the actual control of processes are also shown in the process control diagram presented in FIG. 12. Other signals originate in or go to FIG. 18. The use of these signals has already been explained above.

While an embodiment of the invention has been disclosed, those skilled in the art will recognize that numerous modifications and changes may be made without departing from the true spirit and scope of the claims as defined by the claims annexed to and forming a part of this specification.

The invention claimed is:

1. An air conditioning system which detachably connects to a port on an airplane, the system comprising:
    an air conduit connecting an air intake and filter to a coupling adapted to be connected to one end of an air duct or hose the other end of which is adapted to be connected to an airplane's port;
    a variable speed blower in said air conduit, a pressure sensor connected to said air conduit adjacent said coupling to sense the pressure of air passing into the airplane, and a controller receiving as inputs the pressure sensed by said pressure sensor and a setpoint pressure which can be varied to match the requirements of different types or classes of airplane, the controller varying the speed of the blower to regulate the pressure supplied to an airplane;
    a first air conditioner and a second air conditioner, the first and second air conditioners each comprising a circular refrigerant conduit channeling refrigerant through a compressor, a condenser, an expansion valve, and an evaporator, the evaporator positioned in said air conduit, the first air conditioner's evaporator preceding the blower and the second air conditioner's evaporator following the blower in the air conduit; and
    a condenser cooling fan driving air through the two condensers and controlled by a controller responsive to one or more pressures or temperatures measured in one of the air or refrigerant conduits or in the surrounding air.

2. An air conditioning system in accordance with claim 1 wherein each air conditioner further comprises:
    a refrigerant circuit that bypasses the condenser and expansion valve and that includes a compressor exhaust bypass valve controlled by a controller receiving a signal from a temperature sensor connected to said air conduit downstream of the air conditioner's evaporator and also receiving a setpoint temperature value.

3. An air conditioning system in accordance with claim 2 wherein each air conditioner further comprises:
    an evaporator pressure regulator valve in the refrigerant conduit upstream from the compressor controlled by a controller receiving a signal from a temperature sensor connected to the refrigerant conduit downstream from the evaporator and also receiving a setpoint temperature value.

4. An air conditioning system in accordance with claim 3 wherein each air conditioner further comprises:
    temperature sensors sampling temperatures of the refrigerant upstream and downstream of the evaporator and feeding these temperatures into a controller which regulates the evaporator expansion valve to keep the evaporator whetted.

5. An air conditioning system in accordance with claim 4 further comprising:
    a suction line subcooler comprising a heat exchanger coupling the refrigerant conduit upstream of the evaporator expansion valve to the refrigerant conduit downstream of the evaporator and mounted low to serve as a reservoir for refrigerant.

6. An air conditioning system in accordance with claim 3 further comprising:
    a suction line subcooler comprising a heat exchanger coupling the refrigerant conduit upstream of the evaporator expansion valve to the refrigerant conduit downstream of the evaporator and mounted low to serve as a reservoir for refrigerant.

7. An air conditioning system in accordance with claim 2 wherein each air conditioner further comprises:
    temperature sensors sampling temperatures of the refrigerant upstream and downstream of the evaporator and feeding these temperatures into a controller which regulates the evaporator expansion valve to keep the evaporator whetted.

8. An air conditioning system in accordance with claim 7 further comprising:
    a suction line subcooler comprising a heat exchanger coupling the refrigerant conduit upstream of the evaporator expansion valve to the refrigerant conduit downstream of the evaporator and mounted low to serve as a reservoir for refrigerant.

9. An air conditioning system in accordance with claim 2 further comprising:
a suction line subcooler comprising a heat exchanger coupling the refrigerant conduit upstream of the evaporator expansion valve to the refrigerant conduit downstream of the evaporator and mounted low to serve as a reservoir for refrigerant.

10. An air conditioning system in accordance with claim 1 wherein each air conditioner further comprises:
an evaporator pressure regulator valve in the refrigerant conduit upstream from the compressor controlled by a controller receiving a signal from a temperature sensor connected to the refrigerant conduit downstream from the evaporator and also receiving a setpoint temperature value.

11. An air conditioning system in accordance with claim 10 wherein each air conditioner further comprises:
temperature sensors sampling temperatures of the refrigerant upstream and downstream of the evaporator and feeding these temperatures into a controller which regulates the evaporator expansion valve to keep the evaporator whetted.

12. An air conditioning system in accordance with claim 11 further comprising:
a suction line subcooler comprising a heat exchanger coupling the refrigerant conduit upstream of the evaporator expansion valve to the refrigerant conduit downstream of the evaporator and mounted low to serve as a reservoir for refrigerant.

13. An air conditioning system in accordance with claim 10 further comprising:
a suction line subcooler comprising a heat exchanger coupling the refrigerant conduit upstream of the evaporator expansion valve to the refrigerant conduit downstream of the evaporator and mounted low to serve as a reservoir for refrigerant.

14. An air conditioning system in accordance with claim 1 wherein each air conditioner further comprises:
temperature sensors sampling temperatures of the refrigerant upstream and downstream of the evaporator and feeding these temperatures into a controller which regulates the evaporator expansion valve to keep the evaporator whetted.

15. An air conditioning system in accordance with claim 14 further comprising:
a suction line subcooler comprising a heat exchanger coupling the refrigerant conduit upstream of the evaporator expansion valve to the refrigerant conduit downstream of the evaporator and mounted low to serve as a reservoir for refrigerant.

16. An air conditioning system in accordance with claim 1 further comprising:
a suction line subcooler comprising a heat exchanger coupling the refrigerant conduit upstream of the evaporator expansion valve to the refrigerant conduit downstream of the evaporator and mounted low to serve as a reservoir for refrigerant.

17. An air conditioning system in accordance with claim 1 further comprising:
an air conditioner processor responsive to one or more pressures or temperatures measured in of the air or refrigerant conduits that starts up the two air conditioner's compressors and starts up the blower first to a lower speed to check the system and then to its normal operating speed, completing these tasks in about 30 seconds.

18. An air conditioning system in accordance with claim 1 further comprising:
a differential pressure sensor across the filter providing a pressure measurement to an air conditioner processor that signals when the pressure measurement indicates the filter will soon need cleaning or replacement.

19. An air conditioning system which detachably connects to a port on an airplane, the system comprising:
an air conduit connecting an air intake and filter to a coupling adapted to be connected to one end of an air duct or hose the other end of which is adapted to be connected to an airplane's port;
a variable speed blower in said air conduit, a pressure sensor connected to said air conduit adjacent said coupling to sense the pressure of air passing into the airplane, and a controller receiving as inputs the pressure sensed by said pressure sensor and a setpoint pressure which can be varied to match the requirements of different types or classes of airplane, the controller varying the speed of the blower to regulate the pressure supplied to an airplane;
at least one air conditioner comprising a circular refrigerant conduit channeling refrigerant through a compressor, a condenser, an expansion valve, and an evaporator, the evaporator positioned in said air conduit,
a condenser cooling fan driving air through the two condensers and controlled by a controller responsive to one or more pressures or temperatures measured in one of the air or refrigerant conduits or in the surrounding air; and
a refrigerant circuit that bypasses the condenser and expansion valve and that includes a compressor exhaust bypass valve controlled by a controller receiving a signal from a temperature sensor connected to said air conduit downstream of the air conditioner's evaporator and also receiving a setpoint temperature value.

20. An air conditioning system in accordance with claim 19 wherein each air conditioner further comprises:
an evaporator pressure regulator valve in the refrigerant conduit upstream from the compressor controlled by a controller receiving a signal from a temperature sensor connected to the refrigerant conduit downstream from the evaporator and also receiving a setpoint temperature value.

21. An air conditioning system in accordance with claim 20 wherein each air conditioner further comprises:
temperature sensors sampling temperatures of the refrigerant upstream and downstream of the evaporator and feeding these temperatures into a controller which regulates the evaporator expansion valve to keep the evaporator whetted.

22. An air conditioning system in accordance with claim 21 further comprising:
a suction line subcooler comprising a heat exchanger coupling the refrigerant conduit upstream of the evaporator expansion valve to the refrigerant conduit downstream of the evaporator and mounted low to serve as a reservoir for refrigerant.

23. An air conditioning system in accordance with claim 20 further comprising:
a suction line subcooler comprising a heat exchanger coupling the refrigerant conduit upstream of the evaporator expansion valve to the refrigerant conduit downstream of the evaporator and mounted low to serve as a reservoir for refrigerant.

24. An air conditioning system in accordance with claim 19 wherein each air conditioner further comprises:
- temperature sensors sampling temperatures of the refrigerant upstream and downstream of the evaporator and feeding these temperatures into a controller which regulates the evaporator expansion valve to keep the evaporator whetted.

25. An air conditioning system in accordance with claim 24 further comprising:
- a suction line subcooler comprising a heat exchanger coupling the refrigerant conduit upstream of the evaporator expansion valve to the refrigerant conduit downstream of the evaporator and mounted low to serve as a reservoir for refrigerant.

26. An air conditioning system in accordance with claim 19 further comprising:
- a suction line subcooler comprising a heat exchanger coupling the refrigerant conduit upstream of the evaporator expansion valve to the refrigerant conduit downstream of the evaporator and mounted low to serve as a reservoir for refrigerant.

\* \* \* \* \*